(12) United States Patent
Wang et al.

(10) Patent No.: US 10,140,880 B2
(45) Date of Patent: Nov. 27, 2018

(54) RANKING OF SEGMENTS OF LEARNING MATERIALS

(71) Applicant: FUJITSU LIMITED, Kawasaki-shi, Kanagawa (JP)

(72) Inventors: Jun Wang, San Jose, CA (US); Kanji Uchino, San Jose, CA (US)

(73) Assignee: FUJITSU LIMITED, Kawasaki (JP)

( * ) Notice: Subject to any disclaimer, the term of this patent is extended or adjusted under 35 U.S.C. 154(b) by 482 days.

(21) Appl. No.: 14/796,872

(22) Filed: Jul. 10, 2015

(65) Prior Publication Data

US 2017/0011643 A1 Jan. 12, 2017

(51) Int. Cl.
*G09B 5/02* (2006.01)
*G09B 7/00* (2006.01)

(52) U.S. Cl.
CPC .............. *G09B 5/02* (2013.01); *G09B 7/00* (2013.01)

(58) Field of Classification Search
CPC .................................. G09B 5/00; G09B 5/02
See application file for complete search history.

(56) References Cited

U.S. PATENT DOCUMENTS

| | | | | |
|---|---|---|---|---|
| 8,060,497 B1 * | 11/2011 | Zatsman | ........... | G06F 17/30864 707/723 |
| 8,260,774 B1 * | 9/2012 | Aggarwal | ......... | G06F 17/30864 707/723 |
| 8,280,888 B1 * | 10/2012 | Bierner | ................. | G06F 17/277 704/4 |
| 9,652,675 B2 * | 5/2017 | Kannan | ............... | G06K 9/00718 |

(Continued)

OTHER PUBLICATIONS

"Ranking Metrics and Search Guidance for Learning Object Repository" Neil Y. Yen, Timothy K. Shih, Louis R. Chao, and Qun Jin. IEEE Transactions on Learning Technologies, vol. 3, No. 3, Jul.-Sep. 2010.

(Continued)

*Primary Examiner* — Sam Yao
*Assistant Examiner* — Joshua Luo
(74) *Attorney, Agent, or Firm* — Maschoff Brennan

(57) ABSTRACT

A method of automated ranking of segments of learning materials includes calculating a window similarity between first-window content of a first window in a learning material and second-window content of a second window in the learning material. The method may also include in response to the window similarity between the first-window content of the first window and the second-window content of the second window meeting a similarity threshold, generating a first segment that includes at least the first-window content and the second-window content. The method may include calculating a first-segment consistency measurement for the first segment based on a first-segment similarity between the first-segment content in the first segment and a knowledge point. The method may also include ranking the first segment with respect to one or more of the following: a second segment in the learning material and a third segment in a different learning material, wherein the ranking of the first segment is based on one or more of the following: a quality measurement, a learning material type of the learning material, a length of the first segment, and the first-segment consistency measurement of the first segment.

20 Claims, 15 Drawing Sheets

(56) References Cited

U.S. PATENT DOCUMENTS

| | | | |
|---|---|---|---|
| 2006/0061796 A1* | 3/2006 | O'Sullivan | H04N 1/00864 358/1.14 |
| 2006/0075324 A1* | 4/2006 | Whitten | G06F 17/30864 715/277 |
| 2008/0085102 A1* | 4/2008 | Alm | G09B 5/00 386/248 |
| 2008/0281810 A1* | 11/2008 | Smyth | G06F 17/30864 |
| 2010/0115003 A1* | 5/2010 | Soules | G06F 17/30994 707/822 |
| 2010/0198837 A1* | 8/2010 | Wu | G06F 17/30672 707/748 |
| 2011/0039249 A1* | 2/2011 | Packard | G09B 5/00 434/362 |
| 2011/0047163 A1* | 2/2011 | Chechik | G06F 17/30781 707/741 |
| 2012/0329026 A1* | 12/2012 | Lewolt | G06Q 10/101 434/322 |
| 2013/0073957 A1* | 3/2013 | DiGiantomasso | G06Q 50/20 715/705 |
| 2013/0085955 A1* | 4/2013 | Dugas | G09B 5/00 705/326 |
| 2013/0086035 A1* | 4/2013 | Bao | G06F 17/30864 707/708 |
| 2013/0318063 A1* | 11/2013 | Ayzenshtat | G06F 17/30864 707/707 |
| 2014/0024009 A1* | 1/2014 | Nealon | G09B 5/12 434/362 |
| 2014/0120516 A1* | 5/2014 | Chiang | G09B 5/02 434/362 |
| 2014/0164352 A1* | 6/2014 | Denninghoff | H03H 9/02622 707/711 |
| 2014/0186817 A1* | 7/2014 | Wang | G09B 7/00 434/362 |
| 2015/0026184 A1* | 1/2015 | Ossikine | G06F 17/30705 707/738 |
| 2015/0089368 A1* | 3/2015 | Lester | G06F 17/30778 715/716 |
| 2015/0111190 A1* | 4/2015 | Vittorio | G06F 17/30867 434/319 |
| 2015/0161261 A1* | 6/2015 | Griddaluru | G06F 17/30864 707/707 |
| 2015/0185986 A1* | 7/2015 | Ji | G06F 3/0483 434/362 |
| 2015/0228197 A1* | 8/2015 | McKinney | G09B 5/02 434/127 |
| 2015/0332596 A1* | 11/2015 | Applehans | G09B 5/00 434/309 |
| 2016/0259858 A1* | 9/2016 | Vittorio | G06F 17/30867 |
| 2016/0275804 A1* | 9/2016 | Koppel | G09B 5/12 |
| 2017/0004415 A1* | 1/2017 | Moretti | G09B 5/00 |
| 2017/0124204 A1* | 5/2017 | Gossweiler, III | G06F 17/30867 |

OTHER PUBLICATIONS

"Relevance Ranking Metrics for Learning Objects" Xavier Ochoa and Erik Duval, IEEE Transactions on Learning Technologies, vol. 1, No. 1, Jan.-Mar. 2008.

www.oeconsortium.org/courses, accessed Jul. 16, 2015.

"Automatically Building Research Reading Lists" Micheal D. Ekstrand, et al, GroupLens Research, Department of Computer Science and Engineering, University of Minnesota, ACM, 2010.

"Automatically generating reading lists" James G. Jardine, Technical Report No. 848, University of Cambridge, Computer Laboratory, Feb. 2014.

"Unsupervized Word Segmentation: the case for Mandarin Chinese" Pierre Magistry, Menoit Sagot, Association for Computational Linguistics, pp. 383-387, Jul. 8-14, 2012.

Pending U.S. Appl. No. 14/796,838, filed Jul. 10, 2015.

"Word2Vec and all the thing Data Labs @ Stitch Fix" http://www.docdroid.net/14ssn/word-vectors.pdf.html, accessed Jul. 16, 2015.

"A Word is Worth a Thousand Vectors" Chris Moody, http://multithreaded.stitchfix.com/blog/2015/03/11/word-is-worth-a-thousand-vectors/ Mar. 11, 2015.

* cited by examiner

Lecture Notes

- Lecture notes 1 (ps) (pdf)  Supervised Learning, Discriminative Algorithms
- Lecture notes 2 (ps) (pdf)  Generative Algorithms
- Lecture notes 3 (ps) (pdf)  Support Vector Machines
- Lecture notes 4 (ps) (pdf)  Learning Theory
- Lecture notes 5 (ps) (pdf)  Regularization and Model Selection
- Lecture notes 6 (ps) (pdf)  Online Learning and the Perceptron Algorithm. (optional reading)
- Lecture notes 7a (ps) (pdf)  Unsupervised Learning, k-means clustering
- Lecture notes 7b (ps) (pdf)  Mixture of Gaussians
- Lecture notes 8 (ps) (pdf)  The EM Algorithm
- Lecture notes 9 (ps) (pdf)  Factor Analysis
- Lecture notes 10 (ps) (pdf)  Principal Components Analysis
- Lecture notes 11 (ps) (pdf)  Independent Components Analysis
- Lecture notes 12 (ps) (pdf)  Reinforcement Learning and Control

*Fig. 3B*

Part V
Support Vector Machines

This set of notes presents the Support Vector Machine (SVM) learning algorithm. SVMs are among the best (and many believe are indeed the best) "off-the-shelf" supervised learning algorithm. To tell the SVM story, we'll need to first talk about margins and the idea of separating data with a large "gap." Next, we'll talk about the optimal margin classifier, which will lead us into a digression on Lagrange duality. We'll also see kernels, which give a way to apply SVMs efficiently in very high dimensional (such as infinite-dimensional) feature spaces, and finally, we'll close off the story with the SMO algorithm, which gives an efficient implementation of SVMs.

1 Margins: Intuition

We'll start our story on SVMs by talking about margins. This section will give the intuitions about margins and about the "confidence" of our predictions; these ideas will be made formal in Section 3.

Consider logistic regression, where the probability $p(y = 1|x;\theta)$ is modeled by $h_\theta(x) = g(\theta^T x)$. We would then predict "1" on an input $x$ if and only if $h_\theta(x) \geq 0.5$, or equivalently, if and only if $\theta^T x \geq 0$. Consider a positive training example ($y = 1$). The larger $\theta^T x$ is, the larger also is $h_\theta(x) = p(y = 1|x; w, b)$, and thus also the higher our degree of "confidence" that the label is 1. Thus, informally we can think of our prediction as being a very confident one that $y = 1$ if $\theta^T x \gg 0$. Similarly, we think of logistic regression as making a very confident prediction of $y = 0$, if $\theta^T x \ll 0$. Given a training set, again informally it seems that we'd have found a good fit to the training data if we can find $\theta$ so that $\theta^T x^{(i)} \gg 0$ whenever $y^{(i)} = 1$, and $\theta^T x^{(i)} \ll 0$ whenever $y^{(i)} = 0$, since this would reflect a very confident (and correct) set of classifications for all the training examples. This seems to be a nice goal to aim for, and we'll soon formalize this idea using the notion of functional margins.

For a different type of intuition, consider the following figure, in which x's represent positive training examples, o's denote negative training examples, a decision boundary (this is the line given by the equation $\theta^T x = 0$, and is also called the separating hyperplane) is also shown, and three points have also been labeled A, B and C.

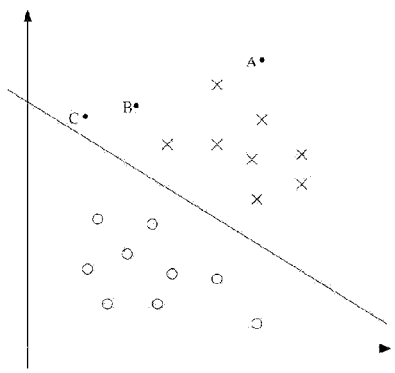

Fig. 3D

Part V

340a — Support Vector Machines

This set of notes presents the Support Vector Machine (SVM) learning algorithm. SVMs are among the best (and many believe are indeed the best) "off-the-shelf" supervised learning algorithm. To tell the SVM story, we'll need to first talk about margins and the idea of separating data with a large "gap." Next, we'll talk about the optimal margin classifier, which will lead us into a digression on Lagrange duality. We'll also see kernels, which give a way to apply SVMs efficiently in very high dimensional (such as infinite-dimensional) feature spaces, and finally, we'll close off the story with the SMO algorithm, which gives an efficient implementation of SVMs. — 344

340b

1 Margins: Intuition — 342

348 — We'll start our story on SVMs by talking about margins. This section will give the intuitions about margins and about the "confidence" of our predictions; these ideas will be made formal in Section 3.

Consider logistic regression, where the probability $p(y = 1|x; \theta)$ is modeled by $h_\theta(x) = g(\theta^T x)$. We would then predict "1" on an input $x$ if and only if $h_\theta(x) \geq 0.5$, or equivalently, if and only if $\theta^T x \geq 0$. Consider a positive training example ($y = 1$). The larger $\theta^T x$ is, the larger also is $h_\theta(x) = p(y = 1|x; w, b)$, and thus also the higher our degree of "confidence" that the label is 1. Thus, informally we can think of our prediction as being a very confident one that $y = 1$ if $\theta^T x \gg 0$. Similarly, we think of logistic regression as making a very confident prediction of $y = 0$, if $\theta^T x \ll 0$. Given — 346 a training set, again informally it seems that we'd have found a good fit to the training data if we can find $\theta$ so that $\theta^T x^{(i)} \gg 0$ whenever $y^{(i)} = 1$, and $\theta^T x^{(i)} \ll 0$ whenever $y^{(i)} = 0$, since this would reflect a very confident (and correct) set of classifications for all the training examples. This seems to be a nice goal to aim for, and we'll soon formalize this idea using the notion of functional margins.

For a different type of intuition, consider the following figure, in which x's represent positive training examples, o's denote negative training examples, a decision boundary (this is the line given by the equation $\theta^T x = 0$, and is also called the separating hyperplane) is also shown, and three points have also been labeled A, B and C.

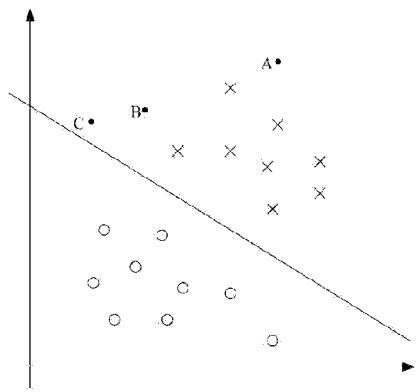

*Fig. 3E*

Part V

340a — Support Vector Machines

This set of notes presents the Support Vector Machine (SVM) learning algorithm. SVMs are among the best (and, many believe are indeed the best) "off-the-shelf" supervised learning algorithm. To tell the SVM story, we'll need to first talk about margins and the idea of separating data with a large "gap." Next, we'll talk about the optimal margin classifier, which will lead us into a digression on Lagrange duality. We'll also see kernels, which give a way to apply SVMs efficiently in very high dimensional (such as infinite-dimensional) feature spaces, and finally, we'll close off the story with the SMO algorithm, which gives an efficient implementation of SVMs. — 356

340b

1 Margins: Intuition — 342

We'll start our story on SVMs by talking about margins. This section will give the intuitions about margins and about the "confidence" of our predictions; these ideas will be made formal in Section 3. — 358

Consider logistic regression, where the probability $p(y = 1|x; \theta)$ is modeled by $h_\theta(x) = g(\theta^T x)$. We would then predict "1" on an input $x$ if and only if $h_\theta(x) \geq 0.5$, or equivalently, if and only if $\theta^T x \geq 0$. Consider a positive training example ($y = 1$). The larger $\theta^T x$ is, the larger also is $h_\theta(x) = p(y = 1|x; w, b)$, and thus also the higher our degree of "confidence" that the label is 1. Thus, informally we can think of our prediction as being a very confident one that $y = 1$ if $\theta^T x \gg 0$. Similarly, we think of logistic regression as making a very confident prediction of $y = 0$, if $\theta^T x \ll 0$. Given a training set, again informally it seems that we'd have found a good fit to the training data if we can find $\theta$ so that $\theta^T x^{(i)} \gg 0$ whenever $y^{(i)} = 1$, and $\theta^T x^{(i)} \ll 0$ whenever $y^{(i)} = 0$, since this would reflect a very confident (and correct) set of classifications for all the training examples. This seems to be a nice goal to aim for, and we'll soon formalize this idea using the notion of functional margins.

For a different type of intuition, consider the following figure, in which x's represent positive training examples, o's denote negative training examples, a decision boundary (this is the line given by the equation $\theta^T x = 0$, and is also called the separating hyperplane) is also shown, and three points have also been labeled A, B and C.

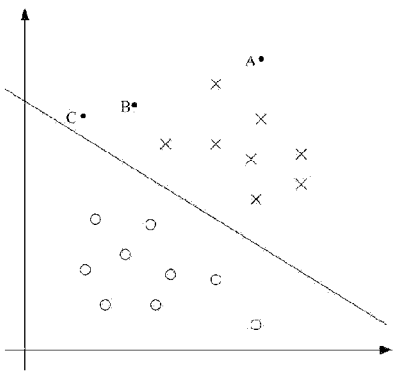

*Fig. 3F*

Part V

340a — Support Vector Machines

This set of notes presents the Support Vector Machine (SVM) learning algorithm. SVMs are among the best (and many believe are indeed the best) "off-the-shelf" supervised learning algorithm. To tell the SVM story, we'll need to first talk about margins and the idea of separating data with a large "gap." Next, we'll talk about the optimal margin classifier, which will lead us into a digression on Lagrange duality. We'll also see kernels, which give a way to apply SVMs efficiently in very high dimensional (such as infinite-dimensional) feature spaces, and finally, we'll close off the story with the SMO algorithm, which gives an efficient implementation of SVMs.

340b

1   Margins: Intuition

342

We'll start our story on SVMs by talking about margins. This section will give the intuitions about margins and about the "confidence" of our predictions; these ideas will be made formal in Section 3.

360

Consider logistic regression, where the probability $p(y = 1|x; \theta)$ is modeled by $h_\theta(x) = g(\theta^T x)$. We would then predict "1" on an input $x$ if and only if $h_\theta(x) \geq 0.5$, or equivalently, if and only if $\theta^T x \geq 0$. Consider a positive training example ($y = 1$). The larger $\theta^T x$ is, the larger also is $h_\theta(x) = p(y = 1|x; w, b)$, and thus also the higher our degree of "confidence" that the label is 1. Thus, informally we can think of our prediction as being a very confident one that $y = 1$ if $\theta^T x \gg 0$. Similarly, we think of logistic regression as making a very confident prediction of $y = 0$, if $\theta^T x \ll 0$. Given a training set, again informally it seems that we'd have found a good fit to the training data if we can find $\theta$ so that $\theta^T x^{(i)} \gg 0$ whenever $y^{(i)} = 1$, and $\theta^T x^{(i)} \ll 0$ whenever $y^{(i)} = 0$, since this would reflect a very confident (and correct) set of classifications for all the training examples. This seems to be a nice goal to aim for, and we'll soon formalize this idea using the notion of functional margins.

362

For a different type of intuition, consider the following figure, in which x's represent positive training examples, o's denote negative training examples, a decision boundary (this is the line given by the equation $\theta^T x = 0$, and is also called the separating hyperplane) is also shown, and three points have also been labeled A, B and C.

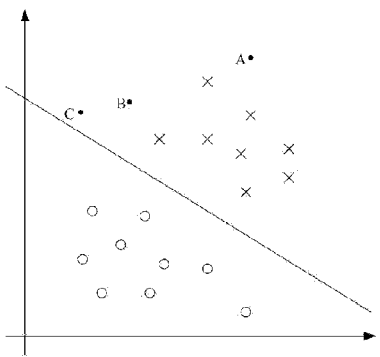

*Fig. 3G*

RANKING OF SEGMENTS OF LEARNING MATERIALS

FIELD

The embodiments discussed herein are related to ranking of segments of learning materials.

BACKGROUND

Unless otherwise indicated herein, the materials described herein are not prior art to the claims in the present application and are not admitted to be prior art by inclusion in this section. Open education resources generally refer to online learning programs or courses that are made publicly available on the Internet or other public access networks. Examples of open education resources may include e-learning programs, Open Courseware (OCW), Massive Open Online Courses (MOOC), and the like. Participation in an open education program typically allows a learner to access learning materials relating to a variety of topics. The learning materials may include lecture notes, course syllabus, example problems, lecture video recordings, and the like.

Various open education resources are currently offered by a number of educational institutions. The number of educational institutions offering open education resources has increased substantially since the inception of open education a little over a decade ago. With the proliferation of open education resources, there has been a concomitant increase in the number of available learning materials available online.

The subject matter claimed herein is not limited to embodiments that solve any disadvantages or that operate only in environments such as those described above. Rather, this background is only provided to illustrate one example technology area where some embodiments described herein may be practiced.

SUMMARY

According to an aspect of an embodiment, a method may include calculating a window similarity between first-window content of a first window in a learning material and second-window content of a second window in the learning material. The method may also include in response to the window similarity between the first-window content of the first window and the second-window content of the second window meeting a similarity threshold, generating a first segment that includes at least the first-window content and the second-window content. The method may include calculating a first-segment consistency measurement for the first segment based on a first-segment similarity between the first-segment content in the first segment and a knowledge point. The method may also include ranking the first segment with respect to one or more of the following: a second segment in the learning material and a third segment in a different learning material. The ranking of the first segment may be based on one or more of the following: a quality measurement, a learning material type of the learning material, a length of the first segment, and the first-segment consistency measurement of the first segment.

The object and advantages of the implementations will be realized and achieved at least by the elements, features, and combinations particularly pointed out in the claims.

It is to be understood that both the foregoing general description and the following detailed description are exemplary and explanatory and are not restrictive of the invention, as claimed.

BRIEF DESCRIPTION OF THE DRAWINGS

Example embodiments will be described and explained with additional specificity and detail through the use of the accompanying drawings in which:

FIG. 3B illustrates another example online learning material that may be analyzed in the personalized learning environment of FIG. 1;

FIG. 3D illustrates a section of an online learning material with example first and second windows;

FIG. 3E illustrates the section of the online learning material in FIG. 3D with first and second new windows;

FIG. 3F illustrates the section of the online learning material in FIGS. 3D and 3E with other example first and second windows;

FIG. 3G illustrates the section of the online learning material in FIGS. 3D-3F with other example first and second new windows;

DESCRIPTION OF EMBODIMENTS

Figure 1:
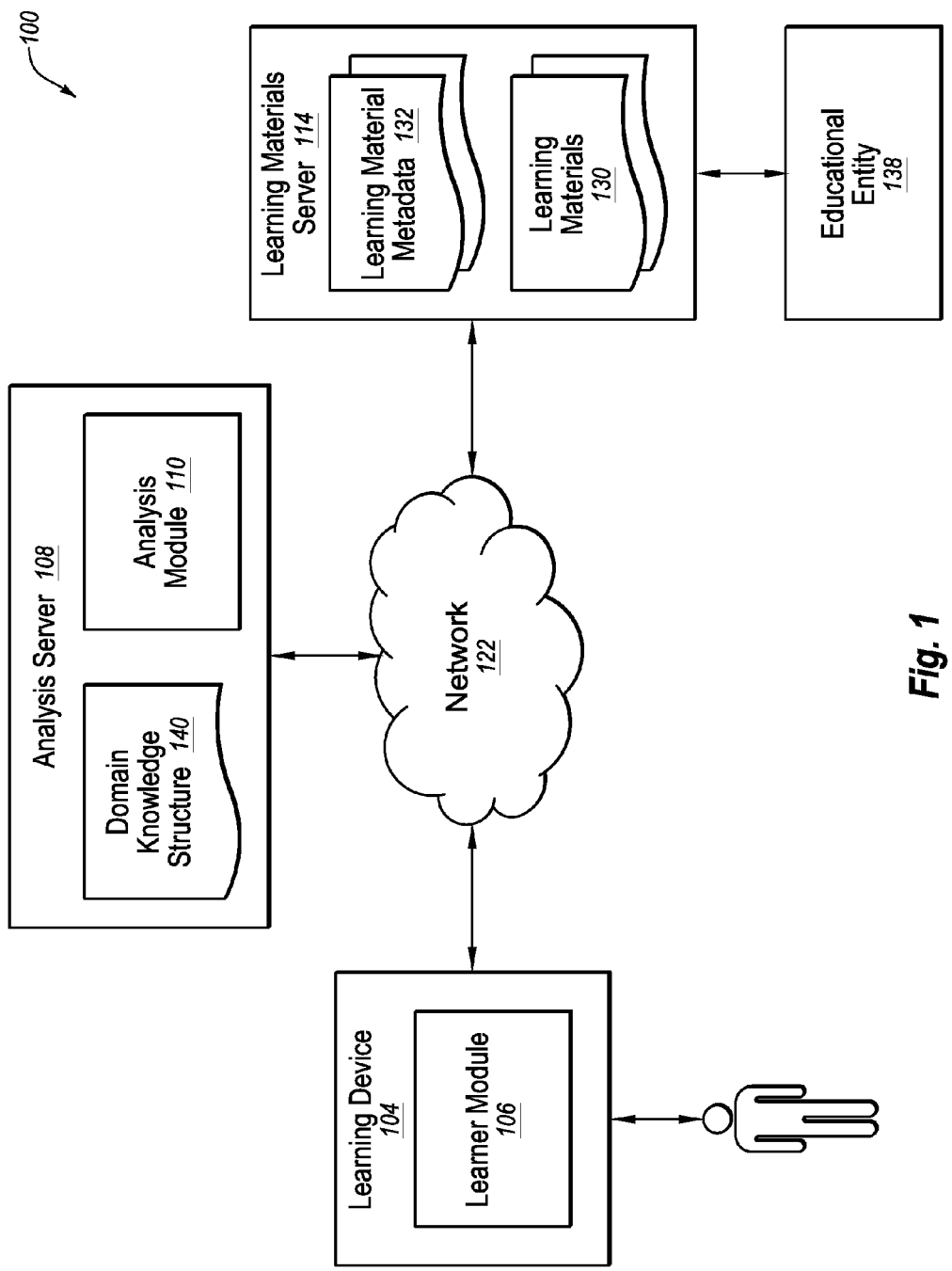
FIG. 1 illustrates a block diagram of an example personalized learning environment in which some embodiments described herein may be implemented.

Learning materials available online have increased of due to the proliferation of open education resources. For example, each course included in an open education resource may include learning materials such as videos, lecture notes, transcripts, test questions, a syllabus, etc. Thus, manual organization (e.g., individuals analyzing and structuring various lecture slides, videos, etc.) of the learning materials has become increasingly difficult.

In addition, the learners who use open education resources may have difficulties finding information related to specific concepts and ascertaining relationships between a specific concept and related concepts. Some educational programs provide learners with manually created organizational structures. These structures may include broad concepts with embedded sub-concepts. However, these structures are often incomplete and poorly-updated due to the effort of manually analyzing and re-analyzing learning materials.

Also, ranking and recommendation of open education learning materials to aid in organizing massive learning materials based on many ranking mechanisms may be fairly limited. Many ranking mechanisms only use keyword matching, text similarity comparison, and simple condition filtering. Additionally, such ranking mechanisms may generally only be applied to learning materials in closed learning management systems instead of to learning materials available online in open education programs. Further, some ranking mechanisms may only be applied to learning materials and disregard ranking of relevant partitions or segments of learning materials.

Accordingly, embodiments described herein automatically analyze available learning materials to extract and organize the concepts discussed therein. Many learning materials inherently include structural information that may be used to identify concepts discussed in a particular learning material and relationships between discussed concepts. Thus, some embodiments described herein perform an analysis of the learning materials to extract the concepts and determine the relationships between the concepts based on the structural information. By extracting the concepts and the relationships therebetween, the concepts may be organized to allow learners to logically navigate through the concepts and that illustrates relationships between the concepts. Some embodiments disclosed herein may provide an approach for generating relevant segments of online open education learning materials, as well as ranking and recommendation of the segments that may be an improvement over other ranking and recommendation mechanisms.

Throughout this application, the term "knowledge point" is used to refer to the "concepts" of the learning materials. The knowledge points of a learning material may include any term or set of words that represent a concept, a notion, an idea, etc. discussed or otherwise presented in the learning material. A knowledge point may include, for instance, the topics, the subtopics, and key terms of the learning materials. For example, a set of learning materials may pertain to a few courses on machine learning. The knowledge points may include topics and subtopics discussed in the courses such as neural networks, statistical inferences, clustering, and structural predictions.

Embodiments described herein generally identify, extract, and organize the knowledge points of learning materials. For example, some embodiments described herein may provide a learning support system which may automatically identify and extract fine-granularity knowledge points and relationships between the knowledge points from massive learning materials. These embodiments may further align the knowledge points with corresponding learning materials and provide links to the learning materials. By aligning the knowledge points with the corresponding learning materials, the learners may be provided with a specific resource that may provide additional information related to the knowledge point.

An example embodiment includes a method of automated domain knowledge structure generation. The domain knowledge structure may include a general organizational structure for the knowledge points. The method may include crawling learning materials and extracting the structural information from the learning materials. The method may also include extracting knowledge points from the learning materials. Hierarchy and/or dependency relationships between the knowledge points may be inferred and the knowledge points may be aligned with one or more of the learning materials. A domain knowledge structure may then be generated. The domain knowledge structure may include the extracted knowledge points organized at least partially according to the extracted structural information. The aligned learning materials may also be included in the domain knowledge structure. A learner may use the domain knowledge structure to gather information about one or more of the knowledge points and to find relationships between the one or more knowledge points and related knowledge points. Additionally, the learners may be pointed to the learning materials aligned with one or more of the knowledge points.

Furthermore, one or more embodiments described herein may generally generate and rank segments of aligned learning materials that may be relevant to a knowledge point. For example, some embodiments described herein may provide a learning support system that may automatically generate and rank segments of aligned learning materials that may be relevant to a knowledge point.

This and other embodiments are described with reference to the appended drawings.

FIG. 1 illustrates a block diagram of an example personalized learning environment (learning environment) 100 in which some embodiments described herein may be implemented. The learning environment 100 may include an analysis server 108 that enables automated generation of a domain knowledge structure 140 from learning materials 130 and learning material metadata 132. The domain knowledge structure 140 may generally include an organized representation of knowledge points extracted from the learning materials 130 and/or metadata 132. The analysis server 108 may be configured to extract the knowledge points and structural information, which may include hierarchy and/or dependency relations between the knowledge points, from the learning materials 130 and/or metadata 132. Based on the extracted knowledge points and the extracted structural information, the analysis server 108 may be configured to generate the domain knowledge structure 140. After the domain knowledge structure 140 is generated, a learner 102 may be able to browse the domain knowledge structure 140 to identify a particular knowledge point that may be of interest.

The analysis server 108 may generate the domain knowledge structure 140 without or with minimal action by an individual. For example, manual operations such as reading, evaluating, and relating the learning materials 130, which are generally performed by individuals may be included in operations performed by the analysis server 108.

An example of the domain knowledge structure 140 may include a hierarchy of knowledge points. In the hierarchy, broad (e.g., more general) knowledge points may be included in higher levels of the hierarchy and narrow (e.g., more specific) knowledge points may be included in lower levels of the hierarchy. For example, a broad knowledge point such as "machine learning" may be included in a first level of the hierarchy and a narrow knowledge point such as "supervised learning" and "unsupervised learning" associated with machine learning may be included in a lower level of the hierarchy that is a sub-level of the first level. Thus, the learner 102 who may be interested in "supervised learning" may begin a navigation with a "machine learning" knowledge point and then may narrow her search to neural networks. In other examples, the domain knowledge structure 140 may include an ontology, a cluster diagram, a list, an outline, or any other suitable organizational model.

Additionally, the analysis server 108 may align one or more of the learning materials 130 with a corresponding knowledge point in the domain knowledge structure 140. The aligned learning materials may be linked or referenced in the domain knowledge structure to the corresponding knowledge point. For example, from the example above, a section of document or portion of a video that includes information related to neural networks may be linked to the neural network knowledge point.

The learning environment 100 of FIG. 1 may include the analysis server 108, a learning materials server 114, and a learner device 104. The learner device 104, the learning materials server 114, and the analysis server 108 may communicate via a network 122. For example, the learner device 104 and the analysis server 108 may communicate the learning materials 130 and the learning material metadata 132 via the network 122.

The network 122 may be wired or wireless, and may have numerous different configurations including a star configuration, a token ring configuration, or other configurations. Furthermore, the network 122 may include a local area network (LAN), a wide area network (WAN) (e.g., the Internet), and/or other interconnected data paths across which multiple devices may communicate. In some embodiments, the network 122 may include a peer-to-peer network. The network 122 may also be coupled to or include portions of a telecommunications network that may enable communication of data in a variety of different communication protocols.

In some embodiments, the network 122 includes BLUETOOTH® communication networks and/or cellular communications networks for sending and receiving data including via short messaging service (SMS), multimedia messaging service (MMS), hypertext transfer protocol (HTTP), direct data connection, wireless application protocol (WAP), e-mail, etc.

Communication via the network 122 may include actively transmitting data as well as actively accessing data. For example, in some embodiments, the learning materials server 114 may transmit the learning materials 130 to the analysis server 108 via the network 122. Additionally, an analysis module 110 may crawl or otherwise access the learning materials 130 of the learning materials server 114 via the network 122.

The learner 102 may include any individual or entity. In some embodiments, the learner 102 may be participating in an open learning course or may use the learning environment 100 for self-directed education. For example, the learner 102 may interface with the analysis server 108 with the intention of conducting research of a particular topic or for the purpose of learning about the particular topic. Accordingly, in these and other embodiments, the learner 102 may access the domain knowledge structure 140 rather than the learning materials 130 directly because the domain knowledge structure 140 may be better organized and/or more comprehensive than the learning materials 130 as stored on the learning materials server 114.

The learner 102 may access the domain knowledge structure 140 via the learner device 104. The learner device 104 may include a computing device that includes a processor, memory, and network communication capabilities. For example, the learner device 104 may include a laptop computer, a desktop computer, a tablet computer, a mobile telephone, a personal digital assistant ("PDA"), a mobile e-mail device, a portable game player, a portable music player, a television with one or more processors embedded therein or coupled thereto, or other electronic device capable of accessing the network 122.

The learner device 104 may include a learner module 106. In some embodiments, the learner module 106 may act in part as a thin-client application that may be stored on a computing device, such as the learner device 104, and in part as components that may be stored on the analysis server 108, for instance. In some embodiments, the learner module 106 may be implemented using hardware including a processor, a microprocessor (e.g., to perform or control performance of one or more operations), a field-programmable gate array (FPGA) or an application-specific integrated circuit (ASIC). In some other instances, the learner module 106 may be implemented using a combination of hardware and software.

The learner module may enable interaction between the learner 102 and the analysis server 108. For example, the learner module 106 may be configured to provide a user interface that allows the learner 102 to access the domain knowledge structure 140. The learner 102 may view the domain knowledge structure 140 or a portion thereof and/or search for the domain knowledge structure 140 via the learner module 106.

In FIG. 1, the learner device 104 is separate from the analysis server 108 and the learner module 106 included in the learner device 104 enables the learner 102 to access the analysis server 108. In some embodiments, the learner 102 may interface directly with the analysis server 108 rather than using the learner module 106. Additionally or alternatively, the learner device 104 may be used by the learner 102 to interface with the analysis server 108 via a browser. Additionally or alternatively, the learner module 106 may be configured to perform one or more operations attributed to the analysis module 110. For example, the learner module 106 may generate the domain knowledge structure 140 based on the learning materials or some portion thereof. The domain knowledge structure 140 may be stored at the learner device 104 or another suitable storage location (e.g., cloud storage, a storage server, etc.).

The learning materials server 114 may include a hardware server that includes a processor, memory, and communication capabilities. In the illustrated embodiment, the learning materials server 114 may be coupled to the network 122 to send and receive data to and from the learner device 104 and the analysis server 108 via the network 122. Additionally, the learning materials server 114 may be coupled to the network 122 such that the analysis module 110 may access the learning material metadata 132 and/or the learning materials 130.

The learning materials server 114 may be configured to host and/or store the learning materials 130 and the learning material metadata 132. The learning materials 130 may be organized according to a course to which the learning materials 130 pertain. The learning material metadata 132 may include metadata from the learning materials 130. Some examples of the learning material metadata 132 may include a course title, a course number, a date or dates of the course, a professor, an institute, the syllabus, a title of one of the learning materials 130 such as the notes, and the explanatory text of the learning materials 130.

The learning materials 130 may include academic course materials, lecture notes, syllabi, videos, example problems/solutions, lecture note list, lecture slide list, video transcripts, electronic books (e-books), lecture slides, seminars, and the like. The learning materials 130 may include or constitute open courseware (OCW), massive online open courses (MOOC), sparsely distributed learning materials such as course pages, pages on professors' personal homepages, or any combination thereof.

The learning materials server 114 may be associated with an educational entity 138. The educational entity 138 may upload or otherwise make available the learning materials 130 and the learning material metadata 132. For example, the educational entity 138 may include a university and/or an education platform. Additionally, the educational entity 138 may include a professor or a department administrator.

For example, the educational entity 138 may include a university or another entity providing open education materials such as OCW. Examples may include the OCW provided by Massachusetts Institute of Technology (MIT) or Tokyo Institute of Technology (TIT). Moreover, the educational entity 138 may include an educational platform that hosts the MOOC such as Coursera, EdX, Udacity, and Futurelearn. Additionally, the educational entity 138 may include a professor or the department administrator that contributes a course webpage, which may be crawled and stored on the learning materials server 114.

In some embodiments, the educational entity 138 may include an entity that is not directly associated with providing educational resources. For instance, the educational entity 138 may include publisher of e-books or a website that hosts videos or images. Examples of these types of educational entities 138 may include YOUTUBE®, an e-book distribution website, and online library, an online digital media store, etc.

The analysis server 108 may include a hardware server that includes a processor, a memory, and network communication capabilities. In the illustrated embodiment, the analysis server 108 may be coupled to the network 122 to send and receive data to and from the learner device 104 and/or the learning materials server 114 via the network 122. The analysis server 108 may include the analysis module 110. The analysis module 110 may be configured to analyze the learning materials 130 and the learning material metadata 132. Additionally, the analysis module 110 may be configured to interact with the learner module 106 to analyze the learning materials 130 and the learning material metadata 132 and/or provide the domain knowledge structure 140 to the learner 102.

In some embodiments, the analysis module 110 may be configured to generate the domain knowledge structure 140. In some embodiments, the analysis module 110 may act in part as a thin-client application that may be stored on a computing device, such as the learner device 104, and in part as components that may be stored on the analysis server 108, for instance. In some embodiments, the analysis module 110 may be implemented using hardware including a processor, a microprocessor (e.g., to perform or control performance of one or more operations), a field-programmable gate array (FPGA) or an application-specific integrated circuit (ASIC). In some other instances, the analysis module 110 may be implemented using a combination of hardware and software.

The analysis module 110 may generate the domain knowledge structure 140 with minimal or no manual actions taken by an individual. For example, in the learning environment 100, the analysis module 110 may crawl the learning materials 130. While crawling the learning materials 130, the analysis module 110 may identify, scan, and copy content of the learning materials 130 and may extract the learning material metadata 132.

The analysis module 110 may extract structural information by analyzing the learning materials 130 and the learning material metadata 132. Generally, the structural information may indicate general organization and general content of the learning materials 130. In some circumstances, the learning materials 130 may not be well organized. Additionally, in embodiments in which the learning materials 130 include a MOOC, the learning materials 130 may include a wide variety of information that may relate to multiple sparsely distributed courses. Nevertheless, the analysis module 110 may find structured or semi-structured information during crawling and may extract the structured or semi-structured information.

The analysis module 110 may then generate segmented term sequences from the extracted lists and the page-format analysis. The segmented term sequences may be bounded according to the detected sequence borders. The segmented term sequences may include positional information indicating a position in the learning materials 130 of one or more of the segmented term sequences.

The analysis module 110 may also extract knowledge points from the learning materials 130 and the learning material metadata 132. In some embodiments, the analysis module 110 may derive candidate knowledge points from the segmented term sequences. For example, the analysis module may process the segmented term sequences to derive the knowledge points from the segmented term sequences. The analysis module 110 may also construct a hierarchy of the knowledge points.

Hierarchy relationships between the knowledge points may then be inferred. The hierarchy relationship between a first knowledge point and a second knowledge point may include a determination as to whether the first knowledge point is broader (e.g., having a coarser granularity), narrower (e.g., having a finer granularity), or includes a similar granularity to the second knowledge point. For example, the first knowledge point may include "supervised learning" and the second knowledge point may include "machine learning." Thus, a hierarchy relationship between the first knowledge point and the second knowledge point may include the first knowledge point being narrower (or having a finer granularity) than the second knowledge point.

The analysis module 110 may then align one or more of the knowledge points with one or more of the learning materials 130. The aligned learning materials may be based on granularity of a particular knowledge point. For example, a broad knowledge point may be linked to broader or larger learning material and a narrow knowledge point may be linked to a more distinct or smaller portion of the learning materials 130. The analysis module 110 may then generate the domain knowledge structure 140. The domain knowledge structure 140 may include the extracted knowledge points organized at least partially according to the extracted structural information and including the aligned learning materials.

The analysis module 110 may also automatically rank segments of one or more learning materials. In some embodiments, the learning materials may include the aligned learning materials. Specifically, the learning materials may include learning materials aligned with a knowledge point of interest to the learner 102. In some embodiments, the segments may be fine-granularity segments, and the knowledge points may also be fine-granularity knowledge points. Each of the segments may be relevant to the knowledge point of interest to the learner 102. For example, a relevant segment may include one or more occurrences of the knowledge point.

As will be explained in greater detail, prior to ranking, the analysis module 110 may generate the segments in the one or more learning materials by creating windows in the learning materials, analyzing and comparing the content of the windows, and merging content from windows that meet a similarity threshold into a segment. Once the analysis module 110 generates the segments, they may be ranked with respect to each other based on one or more criteria and according to one or more learner preferences.

Each of the segments may start with an initial point, which the analysis module 110 may select from one or more candidate initial points in a learning material. The analysis module 110 may select the one or more candidate initial points from multiple occurrences of the knowledge point in the learning material. For example, the analysis module 110 may select, as a candidate initial point, an occurrence of the knowledge point located in: a title of a video included in the learning material, a transcript of the video, a title of an article included in the learning material, or a title corresponding to one or more slides included in the learning material. The title of the article may include, for example, a general or overall title of the article or a more specific title of a section of the article. The title corresponding to one or more slides may include, for example, a general or overall title of the one or more slides or a title relating to one or more pages of the one or more slides, where each of the one or more pages may include a single slide or one or more slides merged together based on similar subject matter.

For example, a learner may be interested in a knowledge point "neural networks." A title of a video learning material aligned with the knowledge point may include an occurrence of the term "neural networks". For example, the title of the video may be "Neural Network Improvements." The analysis module 110 may select the occurrence of the knowledge point in the title of the video as a candidate initial point in the learning material. Also, for example, a general or overall title of an article included in a learning material aligned with the knowledge point may be "Neural Networks: An Overview," and within the article there may be a section titled "Types of Neural Networks." The analysis module 110 may select both the occurrence of the knowledge point in the overall title of the article and the occurrence of the knowledge point in the section title of the article as candidate initial points.

For simplicity in the discussion that follows, creation of two windows by the analysis module 110 is discussed. However, the analysis module 110 may create more than two windows, the content of which may be compared and included in a segment in a learning material, similar to the operations described below.

The analysis module 110 may create a first window and a second window in a learning material aligned with a knowledge point. For simplicity, in the present description, the first and second windows are assumed to have a same window size. The first window may include the initial point. The analysis module 110 may compare the content of the first and second windows to each other and calculate a window similarity based on the similarity of the content, as will later be described in more detail. The window similarity may be based on the semantic similarity of the content of the first and second windows. In response to the window similarity meeting a similarity threshold, the analysis module 110 may generate a first segment including at least the content of the first and second windows, as will also later be described in more detail. The analysis module 110 may slide the first and second windows through the learning material to create a first new window and a second new window, as will later be described in more detail. For simplicity, in the present description the first and second new windows are assumed to have the same window size. For simplicity, in the present description the first and second windows are assumed to slide by the same number of basic units or step size. The analysis module 110 may slide the first and second windows by a first step size to create the first new window and the second new window. For example, the analysis module 110 may slide the start of the first window by the first step size, and the analysis module 110 may slide the start of the second window by the first step size to determine the start of the first new window and the start of the second new window, respectively. A start of the first window may be separated from a start of the second window by a first separation size. The analysis module 110 may slide both the first and second windows by the first step size, which may include the same number of the basic unit as in the first separation size in some embodiments. Thus, the second window and the first new window may overlap, and the content of the second window may be the same as the content of the first new window.

In response to the first and second new windows meeting the similarity threshold, the analysis module 110 may extend the first segment to include the content of the second new window. Further, in response to the first and second new windows meeting the similarity threshold, the analysis module 110 may slide the first and second new windows in a manner similar to the first and second windows to create a first additional new window and a second additional new window. The analysis module 110 may then compare the content of the first and second additional new windows with each other and extend the first segment to include the content of the second of the additional windows in response to the first and second additional new windows meeting the similarity threshold. The analysis module 110 may repeat the operations of extending the first segment or adding additional content to the first segment until the end of the learning material is reached or until new windows fail to meet the similarity threshold, at which point the analysis module 110 may generate a first segment border, as will later be described in more detail. In response to the first segment including one or more windows, all of which have met a similarity threshold, the first segment may be a consistent segment.

The analysis module 110 may generate more than one segment in the learning material. For example, in response to the analysis module 110 generating a first segment (e.g., generating the segment described above), the analysis module 110 may determine if a candidate initial point follows the first segment in the learning material. For example, if the learning material includes an article, and the first segment is located in the article and ends on page five (5) of the article, the analysis module 110 may determine if a candidate initial point is located between the end of the first segment on page five (5) of the article and the end of the learning material.

In response to determining the candidate initial point follows the first segment in the learning material, the analysis module 110 may set the candidate initial point as an initial point for a second segment, as will later be described in more detail. The candidate initial point for the second segment may be a first candidate point following the end of the first segment. One or more candidate initial points may follow the first candidate initial point in the learning material. The second segment may then be generated and additional content may be added to the second segment in a similar manner as outlined for the segment referred to above.

In addition to generating segments in the one or more learning materials, the analysis module 110 may also rank the segments with respect to each other. As will later be described in more detail, the analysis module 110 may rank each of the segments based on one or more of the following:

a quality measurement of the respective segment, a learning material type of the respective segment, a length of the respective segment, and a consistency measurement of the respective segment.

The analysis module 110 may rank each of the segments by determining a rank score for the each of the segments according to the following expression in some embodiments:

$$a \times QM + b \times CM + c \times L + d \times TM$$

$$a+b+c+d=1.$$

In the above-expression, QM may represent a quality measurement for a segment, CM may represent a consistency measurement for the segment, L may represent a length of the segment, which may be normalized, and TM may represent a learning material type match. In the above-expression, a, b, and c represent weights assigned to the quality score, the consistency measurement, the length of the segment, and the learning material type match, respectively.

In some embodiments, the learning material type match may equal either zero (0) or one (1). For example, the learning material type match may equal zero (0) in response to a learning material type in which the segment is located not being the same as a learning material type preference of the learner 102. Additionally or alternatively, the learning material type match may equal one (1) in response to the learning material type matching the learning material type preference of the learner 102. The analysis module 110 may compare the rank scores for each of the segments, and a segment with a higher score may be assigned a higher ranking than a segment with a lower score. Segments may be recommended to the learner 102 based on their ranking score. Specifically, segments with a higher ranking score compared to other segments may be recommended to the learner 102.

The analysis module 110 may calculate the quality measurement for the segment based on one or more learning-specific features associated with a particular segment or a particular learning material in which the particular segment is located. The learning-specific features may include, for example, one or more of the following: an associated individual (e.g., a professor, instructor, or author of the learning material), a teaching or publication date, an associated course, an associated educational entity, content of the learning material, and/or other learning-specific features. For example, a quality measurement for a segment associated with or located in a learning material associated with a prestigious or well-known educational entity and/or author may be higher than a quality measurement for a segment associated with or located in a learning material associated with an obscure educational entity and/or author. A quality measurement for a segment included in a learning material with a recent publication date may be higher than a quality measurement for a segment in a learning material with an older publication date.

The learning-specific feature may include metadata that is specific to and/or describes the learning material and/or the segment. The analysis module 110 may extract one or more learning-specific features from the learning material and/or the segment. Some additional details of learning-specific feature extraction may be found in U.S. application Ser. No. 13/731,996, entitled "Ranking and Recommendation of Open Education Materials," filed Dec. 31, 2012, which is incorporated herein by reference in its entirety.

The learning material type may include, for example, a video, an article, a text, and/or one or more slides. In response to the segment being located in a video, the segment length may be based on a duration of the segment. In response to the segment being located in an article or text, the segment length may be based on a number or words or bytes in the segment. In response to the segment being located in one or more slides, the segment length may be based on a number of pages in the one or more slides included in the segment or a number of slides in the segment. The segment length may also be normalized.

A window size may correspond to a basic unit or a multiple of the basic unit. In response to the segment being located in an article or video, the basic unit may include, for example, a sentence of the article or a sentence of a transcript of the video, respectively. In response to the segment being located in one or more slides, the basic unit may include, for example, a page of the one or more slides. The page may include a single slide or one or more slides merged together based on similar subject matter. In some embodiments, the page may include a single slide and one or more slides that add additional contents into the single slide merged together.

The consistency measurement of the segment may be based on a segment similarity between the segment content and the knowledge point and/or a query from the learner 102, as will later be explained in more detail. The segment similarity may be based on the semantic similarity between the segment content and the knowledge point and/or a query from the learner 102. The analysis module 110 may analyze the knowledge point and/or the query with unsupervised text analysis to determine the segment similarity in some embodiments. Additionally or alternatively, the analysis module 110 may also analyze the segment with unsupervised text analysis to determine the segment similarity. Unsupervised text analysis may be performed on the entire learning material in which the segment is located and/or additional materials aligned with the knowledge point. The analysis module 110 may then calculate the segment similarity using reduced-dimension vectors.

In some embodiments, the analysis module 110 may represent the knowledge point and/or the query by term vectors in a vector space model. The analysis module 110 may also represent the segment content by term vectors in the vector space model such that the consistency measurement of the segment may be calculated. The consistency measurement may be calculated according to the following expression in some embodiments:

$$\text{Consistency Measurement} = \text{Similarity}(q,d) = \cos(\theta),$$
$$0 < \cos(\theta) < 1.$$

In the above-expression, "q" may represent the term vector of the knowledge point or the query, "d" may represent the term vector of the segment, and "$\cos(\theta)$" may be the cosine of an angle "$\theta$" between the term vectors "q" and "d." The analysis module 110 may also adjust the consistency measurement based on a sum of the scores for each of the plurality of occurrences of the knowledge point in the learning material, as will later be described in more detail.

The learner module 106 may also be configured to provide a user interface that allows the learner 102 to select one or more learner preferences. For example, the learner 102 may select, via the user interface, a learning material type, a basic unit, a window size, a step size, a learning-specific feature, a segment age based on, for example, a publication date, and/or a segment length. After generating segments of learning materials that are relevant to a knowledge point and ranking the segments with respect to each other, the analysis module 110 may then remove or filter out one or more of the segments that do not align with or match one or more of the learner preferences. In some embodiments, the analysis module 110 may be configured to filter out the segments that do not align with or match one or more of the learner preferences prior to recommending any of the segments to the learner. Therefore, in some embodiments, the segments that do not match one or more of the learner preferences may not be displayed to the learner 102. Additionally or alternatively, the analysis module 110 may remove segments that do not match one or more of the learner preferences prior to ranking the segments. As mentioned above, the analysis server 108 may generate a domain knowledge structure. In some embodiments, the domain knowledge structure 140 generated by the analysis server 108 may include extracted knowledge points organized at least partially according to extracted structural information and including segments of learning materials aligned with a knowledge point. Additionally or alternatively, the ranking of the segments with respect to other segments of the learning materials aligned with the knowledge point may be included in the domain knowledge structure 140. Also, in some embodiments, a list of the highest ranked segments of one or more learning materials aligned with a knowledge point may be displayed to the learner 102.

Modifications, additions, or omissions may be made to the learning environment 100 without departing from the scope of the present disclosure. Specifically, embodiments of the learning environment 100 are depicted in FIG. 1 as including one learner 102, one learning materials server 114, one learner device 104, and one analysis server 108. However, the present disclosure applies to a learning environment 100 including one or more learners 102, one or more learning materials servers 114, one or more learner devices 104, and one or more analysis servers 108, or any combination thereof. In some embodiments, the domain knowledge structure 140 may be not generated by the analysis server 108.

Moreover, the separation of various components in the embodiments described herein is not meant to indicate that the separation occurs in all embodiments. Additionally, it may be understood with the benefit of this disclosure that the described components may be integrated together in a single component or separated into multiple components.

In the learning environment 100, memory such as memory in the learner device 104, the analysis server 108, and the learning materials server 114 may include a non-transitory memory that stores data for providing the functionality described herein. The memory may be included in storage that may be a dynamic random access memory (DRAM) device, a static random access memory (SRAM) device, flash memory, or some other memory devices. In some embodiments, the storage also includes a non-volatile memory or similar permanent storage device and media including a hard disk drive, a floppy disk drive, a CD-ROM device, a DVD-ROM device, a DVD-RAM device, a DVD-RW device, a flash memory device, or some other mass storage device for storing information on a more permanent basis.

Figure 2:
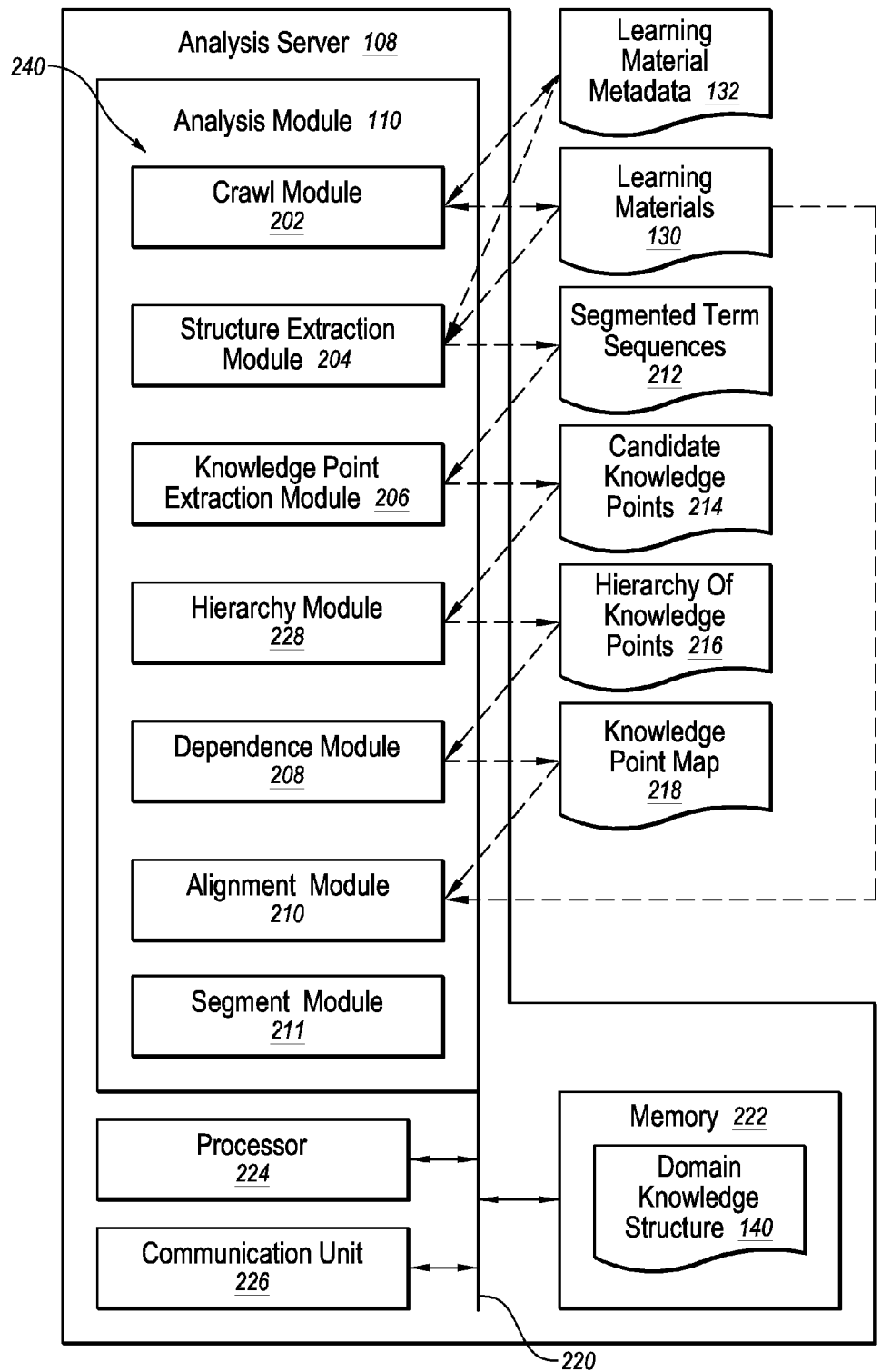
FIG. 2 is a block diagram of an example source analysis server that may be implemented in the personalized learning environment of FIG. 1.

FIG. 2 illustrates an example of the analysis server 108 including an example of the analysis module 110. The analysis server 108 of FIG. 2 includes the analysis module 110, a processor 224, a memory 222, and a communication unit 226. The components (110, 222, 224, and 226) of the analysis server 108 may be communicatively coupled by a bus 220.

The processor 224 may include an arithmetic logic unit (ALU), a microprocessor, a general-purpose controller, or some other processor array to perform computations and software program analysis. The processor 224 may be coupled to the bus 220 for communication with the other components (e.g., 110, 222, and 226). The processor 224 generally processes data signals and may include various computing architectures including a complex instruction set computer (CISC) architecture, a reduced instruction set computer (RISC) architecture, or an architecture implementing a combination of instruction sets. Although in FIG. 2 the analysis server 108 is depicted as including a single processor 224, multiple processors may be included in the analysis server 108. Other processors, operating systems, and physical configurations may be possible.

The memory 222 may be configured to store instructions and/or data that may be executed by the processor 224. The memory 222 may be coupled to the bus 220 for communication with the other components. The instructions and/or data may include code for performing the techniques or methods described herein. The memory 222 may include a DRAM device, an SRAM device, flash memory, or some other memory device. In some embodiments, the memory 222 also includes a non-volatile memory or similar permanent storage device and media including a hard disk drive, a floppy disk drive, a CD-ROM device, a DVD-ROM device, a DVD-RAM device, a DVD-RW device, a flash memory device, or some other mass storage device for storing information on a more permanent basis.

The communication unit 226 may be configured to transmit and receive data to and from at least one of the learning materials server 114 and the learner device 104, and the analysis server 108 depending upon where the analysis module 110 is stored. The communication unit 226 may be coupled to the bus 220. In some embodiments, the communication unit 226 includes a port for direct physical connection to the network 122 or to another communication channel. For example, the communication unit 226 may include a USB, SD, CAT-5, or similar port for wired communication with the components of the learning environment 100. In some embodiments, the communication unit 226 includes a wireless transceiver for exchanging data via communication channels using one or more wireless communication methods, including IEEE 802.11, IEEE 802.16, BLUETOOTH®, or another suitable wireless communication method.

In some embodiments, the communication unit 226 includes a wired port and a wireless transceiver. The communication unit 226 may also provide other conventional connections to the network 122 for distribution of files and/or media objects using standard network protocols including transmission control protocol/internet protocol (TCP/IP), HTTP, HTTP secure (HTTPS), and simple mail transfer protocol (SMTP), etc. In some embodiments, the communication unit 226 may include a cellular communications transceiver for sending and receiving data over a cellular communications network including via SMS, MMS, HTTP, direct data connection, WAP, e-mail, or another suitable type of electronic communication.

In the illustrated embodiment of FIG. 2, the analysis module 110 may include a crawl module 202, a structure extraction module 204, a knowledge point extraction module 206, a hierarchy module 228, a dependency module 208, an alignment module 210, and a segment module 211 (collectively, the modules 240). Each of the modules 240 may be implemented as software including one or more routines configured to perform one or more operations. The modules 240 may include a set of instructions executable by the processor 224 to provide the functionality described herein. In some instances, the modules 240 may be stored in or at least temporarily loaded into the memory 222 of the analysis server 108 and may be accessible and executable by the processor 224. One or more of the modules 240 may be adapted for cooperation and communication with the processor 224 and components of the analysis server 108 via the bus 220.

The crawl module 202 may be configured to crawl the learning materials 130 and/or extract the learning material metadata 132. For example, the crawl module 202 may perform operations performed by a web crawler, a web spider, an ant, an automatic indexer, a web scutter, or another suitable bot. The crawl module 202 may copy pages or some data included therein that the crawl module 202 visits and/or communicate information and data included in crawled learning materials 130 and/or extracted the learning material metadata 132 to the analysis module 110.

In some embodiments, the learning materials 130 and/or the learning material metadata 132 or some portion thereof may be communicated to the analysis module 110. For example, with reference to FIGS. 1 and 2, the learning materials server 114 may communicate the learning materials 130 to the analysis server 108. One or more of the other modules 240 may accordingly access data included in the learning materials 130 and/or the learning material metadata 132. Additionally, in some embodiments, the one or more of the learning materials 130 and/or the learning material metadata 132 may be identified and/or extracted as described in U.S. application Ser. No. 13/732,036, entitled: "Specific Online Resource Identification And Extraction," filed Dec. 31, 2012, which is incorporated herein by reference in its entirety.

The structure extraction module 204 may be configured to extract structural information from the learning materials 130 and/or the learning material metadata 132, which may indicate general organization and content of the learning materials 130. For instance, the structure extraction module 204 may extract lists of syllabi, lecture notes, and tables of contents, etc. included in the learning materials 130. The structured information in the lists may relate to the granularity and general organization of the information included in the learning materials 130. For example, a table of contents may include candidate knowledge points (e.g., the headings, subheadings, etc.) and may indicate which knowledge points have a similar granularity (e.g., each subheading may include a similar granularity).

Figure 3A:
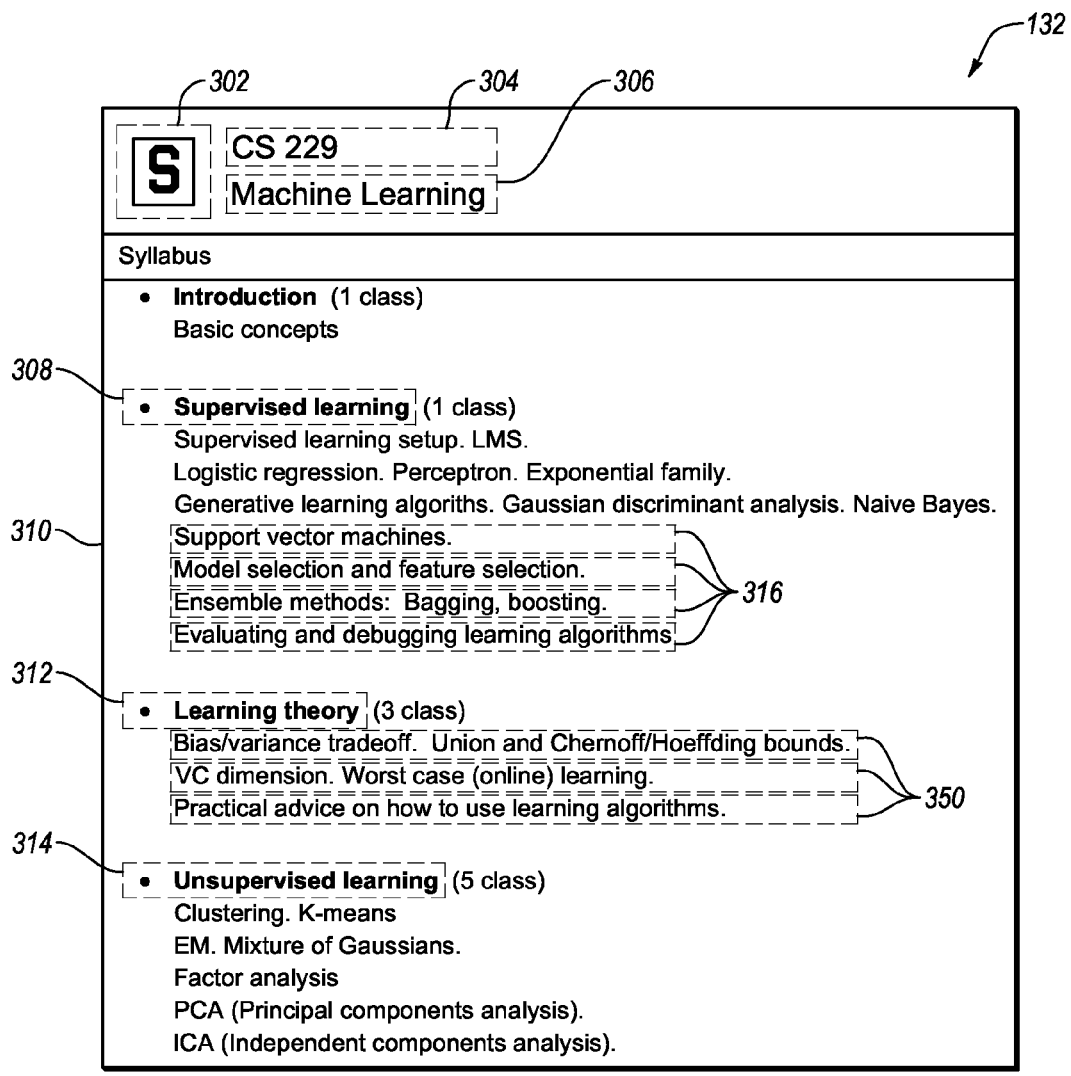
FIG. 3A illustrates an example online learning material that may be analyzed in the personalized learning environment of FIG. 1.

For example, with reference to FIGS. 3A and 3B, an example syllabus 310 and an example lecture note list 336 are illustrated. The syllabus 310 and the lecture note list 336 may include examples of the learning materials 130 that include various structural or semi-structural information that the structure extraction module 204 of FIG. 2 may extract. The syllabus 300 may include an institution indicator 302, a course number 304, a course title 306, which may be examples of learning course metadata such as the learning course metadata 132 of FIG. 1. In the syllabus 300, the institution indicator 302, the course number 304, the course title 306 may indicate general information about a course to which the syllabus 310 belongs, such as, for example, general subject matter of the course.

Additionally in the syllabus 310, a first top level topic of machine learning course may include "supervised learning," a second top level topic may include "learning theory," and a third top level topic may include "unsupervised learning," which are depicted by topic headings 308, 312, and 314, respectively. Moreover, some sub-topics related to the first top level topic of supervised learning may include "support vector machines," "model selection and feature selection," ensemble methods: Bagging, boosting," and "evaluation and debugging learning algorithms," as depicted by class sub-topics 316 that appear under the topic heading 308. Likewise, class sub-topics related to the second top level topic learning theory are depicted by class sub-topics 350 that appear under the subtopic heading 312.

Referring to FIG. 3B, in the lecture note list 336, a list of lecture notes 334 may include lecture notes that relate to the class sub-topics (e.g., 316 and 350 of FIG. 3A) of a course on machine learning. From the list of lecture notes 334 and the syllabus 310, the structure extraction module 204 of FIG. 2 may ascertain the granularity of the class sub-topics and generally organizational information. For example, the structure extraction module 204 may ascertain that concepts of "support vector machines" "supervised learning," "learning theory," and "VC dimension" are concepts that are related to machine learning. Additionally, the structure extraction module 204 may ascertain that "supervised learning" and "learning theory" are of a first granularity and that "support vector machines" and "VC dimension" are of a second granularity. Additionally still, the structure extraction module 204 may ascertain that "support vector machines" is a sub-topic of "supervised learning" and that "VC dimension" is a sub-topic of "learning theory."

Referring back to FIG. 2, the structure extraction module 204 may also conduct a page-format analysis of one or more pages of the learning materials 130. The page-format analysis may examine the pages for indications of structural information in the learning materials 130 and/or the learning material metadata 132.

Figure 3C:
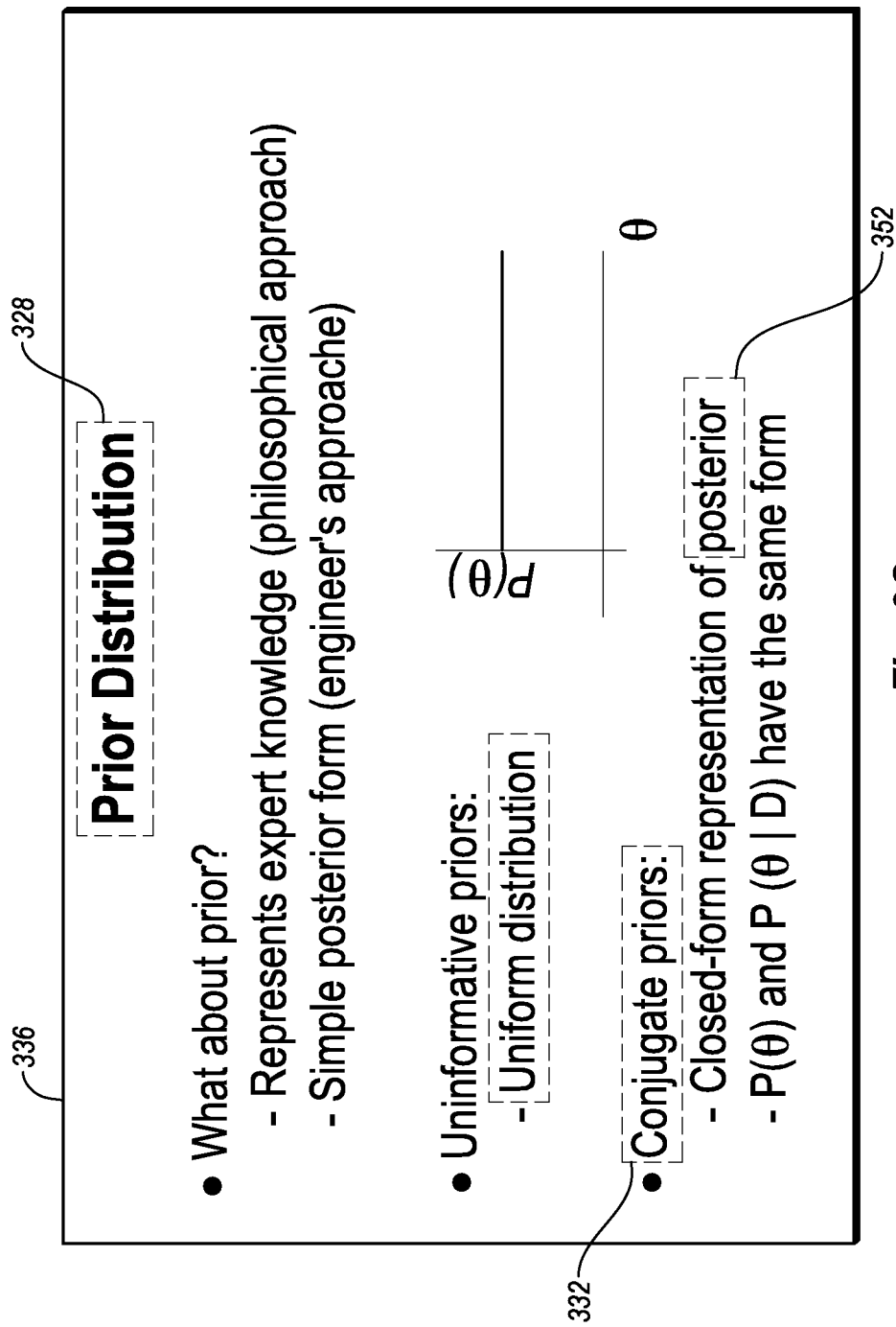
FIG. 3C illustrates another example online learning material that may be analyzed in the personalized learning environment of FIG. 1.

For example, with reference to FIG. 3C, an example lecture slide 330 is illustrated. The lecture slide 330 may be an example of the learning materials 130 of FIGS. 1 and 2. The lecture slide 330 may be analyzed by the structure extraction module 204 of FIG. 2. A title heading 328 of the lecture slide 330 "Prior Distribution" may be extracted. Additionally, a subheading 332 "Conjugate priors:" and/or a term 352 "posterior" may be extracted. Accordingly, the structure extraction module 204 may ascertain that the lecture slide 330 generally relates to a concept of prior distribution as indicated by the title heading 328. Additionally, the structure extraction module 204 may ascertain that a concept of "prior distribution" and "posterior" may be related to prior distribution. Moreover, the structure extraction module 204 may ascertain that the concept of prior distribution may have a different granularity than "conjugate priors" and that the term "conjugate priors" may have a finer granularity than "prior distribution."

Referring back to FIG. 2, the structure extraction module 204 may then generate segmented term sequences 212. The segmented term sequences 212 may be based on the structural information in extracted lists and/or data acquired during page-format analysis. The segmented term sequences may be bounded according to the detected sequence borders, which may be detected by the structure extraction module 204. The sequence borders may be based on one or more of line breaks, table cell borders, sentence borders, and specific punctuation.

For example, with reference to FIGS. 2 and 3A-3C, the structure extraction module 204 may detect sequence borders of one or more of the segmented term sequences (e.g., 306, 308, 312, 314, 316, 328, 332, and 334). In particular, with reference to FIG. 3A, the class sub-topics 350 are separated into separate lines, which may include line breaks as sequence borders. Accordingly, segmented term sequences may include each line of the class sub-topics 350. Additionally or alternatively, the structure extraction module 204 may further detect the period (.) between "Bias/variance tradeoff" and "Union and Chernoff/Hoeffding bounds" as a sequence border. Likewise, with reference to FIG. 3C, the subheading 332 "Conjugate priors" is detected as a line which has separated borders.

Referring back to FIG. 2, the segmented term sequences may include positional information. The positional information may indicate a position in the learning materials 130 of one or more of the segmented term sequences. For instance, with reference to FIG. 3A, the positional information may specify that levels and locations of segmented term sequences in a web page.

In FIG. 2, the structure extraction module 204 is depicted as being separate from the crawl module 202. However, in some embodiments, the structure extraction module 204 may operate concurrently with the crawl module 202. For instance, the structure extraction module 204 or some portion thereof may be included in the crawl module 202.

The knowledge point extraction module 206 may be configured to extract knowledge points from the learning materials 130 based on the segmented term sequences generated by the structure extraction module 204. For example, the knowledge point extraction module 206 may unify abbreviations and remove stop phrases in the segmented term sequences.

Generally, unifying abbreviations includes finding the actual term(s) to which an abbreviation (e.g., an acronym, an initialism, a clipping, a reduced compound term, etc.) refers. For example, an abbreviation may include SVD, which may refer to the name singular value decomposition or an abbreviation may include PCA, which refers to the principal component analysis. The abbreviations may be unified using heuristic rules. An example of a heuristic rule may include a rule to extract a phrase followed by a parenthetical to determine whether the parenthetical includes an abbreviation or an acronym for the phrase.

Stop phrases may generally include words that are removed prior to analysis. Some examples of the stop phrases may include domain-specific words such as "lecture" or "notes" as well as general stop words such as "the," or "a."

The knowledge point extraction module 206 may construct a generalized suffix tree of the segmented term sequences. The knowledge point extraction module 206 may be configured to then discover repeated phrase instances from the segmented term sequences. The repeated phrase instances may be quantified in a frequency for each of the segmented term sequences. In some embodiments, the phrase instances may be limited by a particular maximum length.

The knowledge point extraction module 206 may adjust the frequency of the segmented term sequences. The frequencies may be adjusted based on position of phrase instances in the learning materials 130. The position may include a position in one or more particular course materials. For example, the learning materials 130 may include a page of text including the knowledge point. A page layout analysis may be performed on the page, which may assess a structure of the page and where the knowledge point is present in the structure, e.g., a heading, a sub-heading, a title, a picture captions, a table captions, etc.

The knowledge point extraction module 206 may measure a cohesion and/or a separation of the segmented term sequences. Examples of the cohesion and/or the separation may include mutual information and/or border entropy. The cohesion may be measured according to a mutual information cohesion metric and/or the separation may be measured according to an accessor variety separation. Some additional details of the accessor variety separation and the mutual information cohesion are provided in Pierre Magistry and Benoît Sago, *Unsupervized Word Segmentation: The Case for Mandarin Chinese*, PROCEEDINGS OF THE 50TH ANNUAL MEETING OF THE ASSOCIATION FOR COMPUTATIONAL LINGUISTICS, 383-387 (2012), which is incorporated herein by reference in its entirety.

The knowledge point extraction module 206 may generate candidate knowledge points 214 from the segmented term sequences. The hierarchy module 228 may be configured to receive the candidate knowledge points 214 and to construct a hierarchy of knowledge points 216. For example, the hierarchy module 228 may calculate weights of the candidate knowledge points 214 based on the adjusted frequency. The weights may be calculated according to frequencies, source distributions and/or an authority of the learning materials 130 in which the segmented term sequences appear. If a candidate knowledge point appears with high frequency in the learning materials 130, appears in many different courses, and/or appears in many different offered by authoritative institutes or professors, the candidate knowledge point may have a higher weight than another candidate knowledge point that appears with low frequency in the learning materials 130, appears in few courses, and/or appears in few courses offered by authoritative institutes or professors. A candidate knowledge point's appearance with high frequency in the learning materials 130, for example, may reflect its significance or importance. Additionally, the hierarchy module 228 may analyze the appearance positions of the candidate knowledge points 214. The hierarchy module 228 may then construct the hierarchy of knowledge points 216 based on the appearance positions and weights.

In the hierarchy of knowledge points 216, each of the candidate knowledge points 214 may be assigned a hierarchy level. The hierarchy level may correspond to a level of granularity of the knowledge points and may be based on the position of the knowledge points in the learning materials 130. For instance, a first hierarchy level may be assigned to knowledge points in a syllabus or a lecture note title and a second hierarchy level may be assigned to knowledge points in subtitles or the content of a page. In some embodiments, if a knowledge point is found in multiple positions and/or multiple sources, the knowledge point may be assigned to multiple hierarchy levels, then the hierarchy module 228 may assign a hierarchy level based on frequency in which the knowledge points appear in each type of the learning materials 130. In some embodiments, if a knowledge point is found in multiple positions and/or multiple sources, the knowledge point then the hierarchy module 228 may assign a hierarchy level based on a level distribution of all instances of the knowledge points. In some embodiments, an assigned hierarchy level may be determined by which hierarchy with a most instances of the knowledge point.

The dependency module 208 may receive the hierarchy of knowledge points 216 and infer dependency between the knowledge points. For example, the dependency module 208 may locate positions of each of the knowledge points in each of the learning materials 130. The dependency module 208 may compare relative positions of knowledge points in the learning materials 130. For one or more pairs of knowledge points, the dependency module 208 may decide the relative positions between the two knowledge points in the learning materials 130.

For example, in response to a first knowledge point appearing before a second knowledge point in a lecture note list or a syllabus list of seven (7) courses and after the second knowledge point in a lecture note list or syllabus list of two (2) courses, it may be determined that the first knowledge point has relative position before the second one.

Based on one or more relative positions, the dependency module 208 may recommend an immediate dependency relationship between the two or more knowledge points. From the hierarchy and/or dependency relationships, the dependency module 208 may generate a knowledge point map 218. The knowledge point map 218 may include the hierarchy and/or dependency relationships between the knowledge points. The positions of the knowledge points in the knowledge point map 218 may reflect the learning order suggested by a teacher, for instance.

The alignment module 210 may be configured to align one or more of the learning materials 130 with one or more of the knowledge points. The learning materials 130 may be aligned according to the granularity or hierarchy level of the knowledge point. For example, a first knowledge point may include a term in context of a particular page. The term (and the first knowledge point) may accordingly be included in a low hierarchy level and a fine granularity. Thus, a first learning material aligned with the first knowledge point may include a specific portion (e.g., one sentence or paragraph) of the particular page that includes the term. Likewise, a second knowledge point may include a syllabus heading. The syllabus heading (and the second knowledge point) may accordingly be included in a high hierarchy level and a coarse granularity. Thus, a second learning material aligned with the second knowledge point may include an entire set of lecture notes that describe the second knowledge point. The alignment module 210 may align the first learning material with the first knowledge point and the second learning material with the second knowledge point.

In some embodiments, a knowledge point may be aligned with one or more segments of a video such as a lecture video that may be included in the learning materials 130. The video may be segmented and video topics may be as described in U.S. application Ser. No. 14/245,725, entitled: "Topic Identification In Lecture Videos," filed Apr. 4, 2014, which is incorporated herein by reference in its entirety.

For example, the alignment module 210 may precisely locate each of the knowledge points of the knowledge point map 218 in the learning materials 130. The alignment module 210 may then compare and rank the learning materials 130 aligned with each of the knowledge points. Based on the comparison and ranking of the learning materials 130, the alignment module 210 may align particular learning materials 130 with a particular knowledge point.

In some embodiments, the learning materials 130 may be compared and ranked according to a linear combination of a knowledge point score, a general score, and a type factor. For example, the linear combination may be calculated according to example learning materials alignment equations:

$$a \times KPS + b \times GS + c \times TF$$

$$a+b+c=1$$

In the learning materials alignment equations, a, b, and c represent weights assigned to the knowledge point score, the general score, and the type factor, respectively. The parameter KPS represents the knowledge score, which may be based on the frequency of appearances and positions of each of the knowledge points. The parameter GS may represent the general score. In some embodiments, the general score may be calculated as discussed in U.S. application Ser. No. 13/731,996, entitled: "Ranking And Recommendation Of Open Education Materials," filed Dec. 31, 2012, which has been incorporated herein by reference in its entirety. The parameter TF represents the type factor, which may be based on a learner or administrator preference.

In some embodiments, the segment module 211 may be configured to scan one or more learning materials and locate multiple of occurrences of a knowledge point in the learning materials. The learning materials may include learning materials aligned with the knowledge point. The segment module 211 may set a score for each of the occurrences of the knowledge point in a particular learning material of the learning materials. The score may be based on the location of the knowledge point in the learning material. For example, the score for an occurrence of the knowledge point in a title of the learning material may be higher than the score for an occurrence of the knowledge point in other text, such as detailed or explanatory text, of the learning material. As described later in more detail, the sum of the scores set for each of the occurrences of the knowledge point may be used to calculate a total weight score, which may be used to adjust the consistency measurement.

The segment module 211 may select one or more candidate initial points from the occurrences of the knowledge point in the learning material. For example, the segment module 211 may select a first candidate initial point of the one or more candidate initial points as a first initial point in the learning material. The segment module 211 may select the first candidate initial point based on its location in the learning material. For example, the first candidate initial point may be located closer to the start of the learning material than the rest of the one or more candidate initial points in the learning material.

The segment module 211 may create a first window in the learning material that includes the first initial point. Specifically, the start of the first window may include the first initial point. The segment module 211 may also create a second window in the learning material that is located a first separation size away from the first window. For example, in response to the first separation size being set to one basic unit, a start of the second window may follow a start of the first window in the learning material by one basic unit. Each of the first and second windows may have a window size. The window size of the first window may be the same as the window size of the second window in that the window size of the first window may correspond to the same number of basic units as the window size of the second window. For example, the window size of both the first and second windows may include five (5) basic units. In response to the basic unit including a sentence of an article, the window size of both the first and second windows may include five (5) sentences; however, the five (5) sentences of the first window may be of differing lengths than the five (5) sentences of the second. As such, because the absolute size of individual basic units (e.g., the sizes of different sentences) may vary, the absolute sizes of the first and second windows may not be exactly the same yet may still be referred to as being the same size with respect to the basic unit being used.

The window size may correspond to a basic unit or a multiple of the basic unit. In response to the segment being located in an article or video, the basic unit may include, for example, a sentence of the article or a sentence of a transcript of the video, respectively.

For example, with reference to FIGS. 3D and 3E, an example section of an online learning material 334 is illustrated. The learning material 334 may include an article, which may include one or more titles 340. In the illustrated example, the learning material 334 may include a title 340a and a title 340b. The knowledge point may include "Support Vector Machines" and the title 340a may designate a section of the article with the term "Support Vector Machines." In response to the knowledge point including "Support Vector Machines," the title 340 may thus be deemed as including an occurrence of the knowledge point. The segment module 211 may select the occurrence of the knowledge point in the title of the article 340a as a candidate initial point in response to the occurrence being located in the title 340a as opposed to explanatory text 342 of the article. In response to the occurrence of the knowledge point in the title 340a, which the segment module 211 has selected as the candidate initial point, being located closer to the beginning of the learning material 334 than any the rest of the one or more candidate initial points, the segment module 211 may select the occurrence of the knowledge point in the title 340a as the first initial point in the learning material 334.

As illustrated in FIG. 3D, the segment module 211 may create a first window 336 in the learning material. The first window 336 may include the first initial point (e.g., the title 340a). The segment module 211 may also create a second window 338 in the learning material that is substantially adjacent to the first window 336. As illustrated in FIGS. 3D and 3E, the segment module 211 may set the basic unit to, for example, one sentence in response to the learning material including an article. The window size may correspond to a multiple of the basic unit, which as illustrated in FIG. 3D, may be, for example, five (5) sentences. The title 340a may be counted as a sentence for purposes of creating a window with the window size.

As illustrated in FIG. 3D, both the first window 336 and the second window 338 may have the same window size (e.g., 5 sentences). A start of the second window may follow a start of the first window in the learning material by a first separation size. In the illustrated example, the first separation size may be set to be equal to the window size. In other words, the first separation size may correspond to a same number of the basic unit as the window size. In FIG. 3D, both the first separation size and the window size may be set to five (5) sentences. In response to the first separation size and the window size being equal, the first window 336 may border the second window 338 such that the first window 336 does not overlap with the second window 338. Thus, in response to the first separation size and the window size being equal, the first window 336 may be substantially adjacent to the second window 338. As another example, as illustrated in FIGS. 3F and 3G, a first separation size may also be set to be less than a first-window size. In other words, the first-window size may correspond to a greater number of the basic unit than the first separation size. In response to the first separation size being less than the first-window size, the first window 356 and the second window 358 may overlap. The segment module 211 may slide the first window 356 and the second window 358 by a first step size to create the first new window 360 and the second new window 362. In response to the segment module 211 sliding the first window 356 and the second window 358 by a number of the basic unit equal to a number of the basic unit in the first separation size, the first new window 360 may overlap with the second window 358, and the content of the first new window 360 and the second window 358 may be the same.

Referring back to FIG. 2, the segment module 211 may calculate a window similarity between first-window content of the first window and second-window content of the second window. Calculating the window similarity between first-window content of the first window and second-window content of the second window may include comparing the words and/or phrases of the first and second windows, which in some cases may be semantically similar. The words and/or phrases of the first and second windows may be compared by, for example, vector representation. The segment module 211 may analyze the first-window content and the second-window content with unsupervised text analysis and represent text in the first-window content and the second-window content with reduced-dimension vectors to calculate the window similarity. The first-window content and the second-window content may be compared based on the reduced-dimension vectors. The segment module 211 may also represent the first-window content and the second-window content by term vectors in a vector space model such that the window similarity may be calculated.

In response to the window similarity between the first-window content of the first window and the second-window content of the second window meeting a similarity threshold, the segment module 211 may generate a first segment that includes at least the first-window content and the second-window content.

In response to the window similarity between the first-window content of the first window and second-window content of the second window failing to meet the similarity threshold, the segment module 211 may not include the first initial point, the first-window content of the first window, or the second-window content of the second window in the first segment, and the segment module 211 may determine if a second candidate initial point follows the first candidate initial point in the learning material. The second candidate initial point may include, for example, a candidate initial point directly following the first candidate initial point in the learning material or a candidate initial point following the first window and second window in the learning material. In response to determining that the second candidate initial point follows the first candidate initial point in the learning material, the second candidate initial point may be selected as a second initial point.

In response to the window similarity between the first-window content of the first window and the second-window content of the second window meeting the similarity threshold, the segment module 211 may also create a first new window and a second new window in the learning material. The start of the first new window may follow the start of the first window by one or more basic units or the number of basic units in the first step size. Thus, the first new window may overlap completely with the second window in some embodiments (e.g., when the window sizes of the first new window and the second window are the same number of basic units and equal to the first step size). The first new window and the second new window may follow the first window in the learning material. The second new window may follow both the first window and the second window in the learning material. Also, the second new window may be substantially adjacent to the first new window. The second new window may be located a second separation size away from the first new window. In some embodiments, the second separation size may be the same as the first separation size or different from the first separation size. In response to the first-new window size being greater than the second separation size, the first new window and the second new window may overlap. In response to the first-new window size being equal to the second separation size, the second new window may border the first new window.

For example, with reference to FIGS. 3D and 3E, the segment module 211 may slide the first window 336 and the second window 338 by the first step size to create a first new window 344 and a second new window 346. The start of the first new window 344 may follow the start of the first window 336 by the first separation size, which may include the one or more basic units. In some embodiments, the first step size may be equal to the first separation size. For example, the segment module 211 may slide the first window 336 and the second window 338 by a number of the basic unit equal to the first separation size. Thus, the second window 338 and the first new window 344 may overlap, and the content of the second window 338 may be the same as the content of the first new window 344. Also, the second new window 346 may be located the second separation size away from the first new window 344. Again, in response to the second separation size being equal to the first-new window size, as illustrated in FIG. 3E, the second new window 346 may border the first new window. In FIG. 3E, the first-new window size, the second-new window size, and the second separation size are equal to five (5) sentences.

Referring back to FIG. 2, the segment module 211 may calculate a new-window similarity between first new-window content of the first new window and second new-window22 content of the second new window. The segment module 211 may also analyze the first new-window content and the second new-window content with unsupervised text analysis and represent the first new-window content and the second new-window content with reduced-dimension vectors for purposes of calculating the new-window similarity. The segment module 211 may also represent the first new-window content and the second new-window content by term vectors in a vector space model such that the new-window similarity may be calculated.

In response to the new-window similarity meeting the similarity threshold, the segment module 211 may extend the first segment to include the first new-window content and the second new-window content. In response to the new-window similarity failing to meet the similarity threshold, the segment module 211 may generate a first segment border at the first new window.

Referring to FIG. 3E, the first segment border 348 generated at the first new window in response to the new-window similarity failing to meet the similarity threshold is illustrated.

Referring back to FIG. 2, in a similar manner as outlined, the segment module 211 may continue to extend the first segment to include additional content by calculating a similarity between the additional content of additional windows and adding the additional content of the additional windows to the second segment when the similarity threshold is met. When the additional windows fail to meet the similarity threshold or the end of the learning material is reached, the analysis module 110 may stop adding additional content to the first segment.

The segment module 211 may calculate a first-segment consistency measurement for the first segment. The first-segment consistency measurement for the first segment may be based on a first-segment similarity between the first-segment content in the first segment and the knowledge point. The segment module 211 may determine the first-segment consistency measurement for the first segment using reduced-dimension vectors. Also, the segment module 211 may represent the knowledge point and/or the query by term vectors in a vector space model. The segment module 211 may also represent the first segment content by term vectors in the vector space model such that the consistency measurement for the first segment may be calculated.

The segment module 211 may adjust the consistency measurement for the first segment based on a sum of the scores for each of the plurality of occurrences of the knowledge point in the learning material. The sum of the scores for each of the plurality of occurrences of the knowledge point in the learning material may be referred to as a total weight score. For example, the consistency measurement may be adjusted such that:

Consistency Measurement=Consistency Measurement log(total weight score).

As described in greater detail above, the segment module 211 may also rank the first segment with respect to one or more of the following: a second segment in the learning material and a third segment in a different learning material. The segment module 211 may rank the first segment with respect to any number of segments either in the learning material or in the different learning material. The segment module 211 may rank the first segment based on one or more of the following: a quality measurement of the learning material, a learning material type of the learning material, a length of the first segment, and the first-segment consistency measurement of the first segment.

In response to generating the first segment, the segment module 211 may determine if a second candidate initial point follows the first segment in the learning material. In response to determining that the second candidate initial point follows the first segment in the learning material, the segment module 211 may create a first new-window in the learning material that includes the second initial point. The segment module 211 may also create a second new window in the learning material that is substantially adjacent to the first new window. The second new window may be located a second separation size away from the first new window. In response to the first-new window size being greater than the second separation size, the first new window and the second new window may overlap.

The segment module 211 may calculate a new-window similarity between the first new-window content of the first new window and second new-window content of a second new window. The segment module 211 may also analyze the first new-window content and the second new-window content with unsupervised text analysis and represent the first new-window content and second new-window content with reduced-dimension vectors for purposes of calculating the window similarity. The segment module 211 may also represent the first new-window content and the second new-window content by term vectors in the vector space model such that the new-window similarity for the first segment may be calculated.

In response to the new-window similarity between the first new-window content of the first new window and the second new-window content of the second new window meeting the similarity threshold, the segment module 211 may generate a second segment that includes at least the first new-window content and the second new-window content.

In response to the new-window similarity between the first new-window content of the first new window and the second new-window content of the second new window meeting the similarity threshold, the segment module 211 may slide the first new window and the second new window by a second step size and extend the second segment to include additional windows that meet the similarity threshold using a similar method as it used to add additional windows to the first and second windows of the first segment. In some embodiments, the second step size may be equal to the first step size.

For example, in response to the new-window similarity between the first new-window content of the first new window and the second new-window content of the second new window meeting the similarity threshold, the segment module 211 may create a first additional new window in the learning material that overlaps with the second new window of the second segment. The segment module 211 may also create a second additional new window in the learning material that may be substantially adjacent to the first additional new window. The first and second additional new windows may follow the first new window of the second segment in the learning material. The segment module 211 may calculate an additional-new-window similarity between the first additional-new-window content and the second additional-new-window content, and in response to the additional-new-window similarity meeting the similarity threshold, the segment module 211 may extend the second segment to include the second additional-new-window content. Also, in response to the additional-new-window similarity failing to meet the similarity threshold, the segment module 211 may generate a second segment border.

In a similar manner as outlined, the segment module 211 may continue to extend the second segment to include additional content by calculating a similarity between the additional content of additional windows and adding the additional content of the additional windows to the second segment when the similarity threshold is met. When the additional windows fail to meet the similarity threshold or the end of the learning material is reached, the segment module 211 may stop adding additional content to the second segment.

It will be appreciated that a similarity threshold may be set to be consistent for a learning material or for a plurality of learning materials. Similarly, a basic unit, a window size, a separation size and/or a step size may be set to be consistent for a learning material or for a plurality of learning materials.

Figure 4:
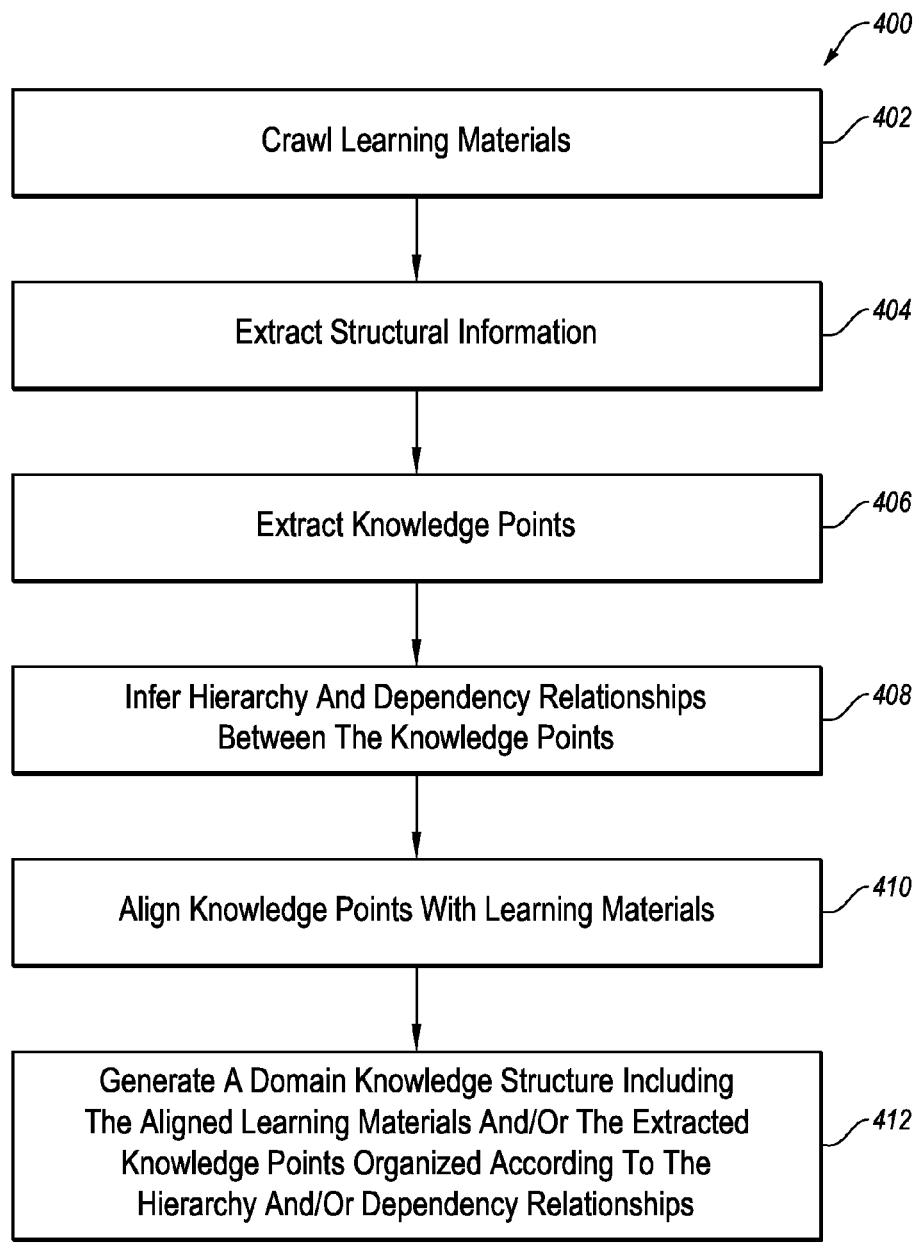
FIG. 4 is a flow diagram of an example method of domain knowledge structure generation.

FIG. 4 is a flow diagram of an example method 400 of generating a domain knowledge structure, arranged in accordance with at least one embodiment described herein. The method 400 may be programmably performed in some embodiments by the analysis server 108 described with reference to FIGS. 1 and 2. The analysis server 108 may include or may be communicatively coupled to a non-transitory computer-readable medium (e.g., the memory 222 of FIG. 2) having stored thereon or encoded therein programming code or instructions that are executable by a processor to perform or cause performance of the method 400. The analysis server 108 may include a processor (e.g., the processor 224 of FIG. 2) that is configured to execute computer instructions to cause or control performance of the method 400. Although illustrated as discrete blocks, various blocks may be divided into additional blocks, combined into fewer blocks, or eliminated, depending on the desired implementation.

The method 400 may begin at block 402. At block 402, learning materials may be crawled. Additionally or alternatively, the learning materials may be received. In some embodiment, the learning materials may include one or more of open courseware, MOOC, personal home pages of professors, department home pages, and e-books. While the learning materials are being crawled, one or more of the operations (e.g., 404, 406, 408, 410, and 412) may be performed.

At block 404, structural information may be extracted from the learning materials. Additionally, the structural information may be extracted from learning materials metadata and semi-structural format information. The semi-structural format information may include, for instance, a structure of a syllabus, a list of lecture notes, a structure/format of lecture note slides, video segmentation, and video segments. At block 406, knowledge points may be extracted from the learning materials. At block 408, hierarchy and dependency relationships may be inferred between the knowledge points. At block 410, the knowledge points may be aligned with one or more of the learning materials. In some embodiments, aligning the knowledge points includes precisely locating each of the knowledge points in the learning materials based on granularity of the knowledge point and comparing and ranking the learning materials aligned with specific knowledge points.

At block 412, a domain knowledge structure may be generated including the aligned learning materials and/or the extracted knowledge points organized at least partially according to the hierarchy and/or dependency relationships between the knowledge points. The domain knowledge structure generated at block 412 may also include segments of the aligned learning materials, which may be ranked and aligned with the extracted knowledge points.

One skilled in the art will appreciate that, for this and other procedures and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the disclosed embodiments.

Figure 5:
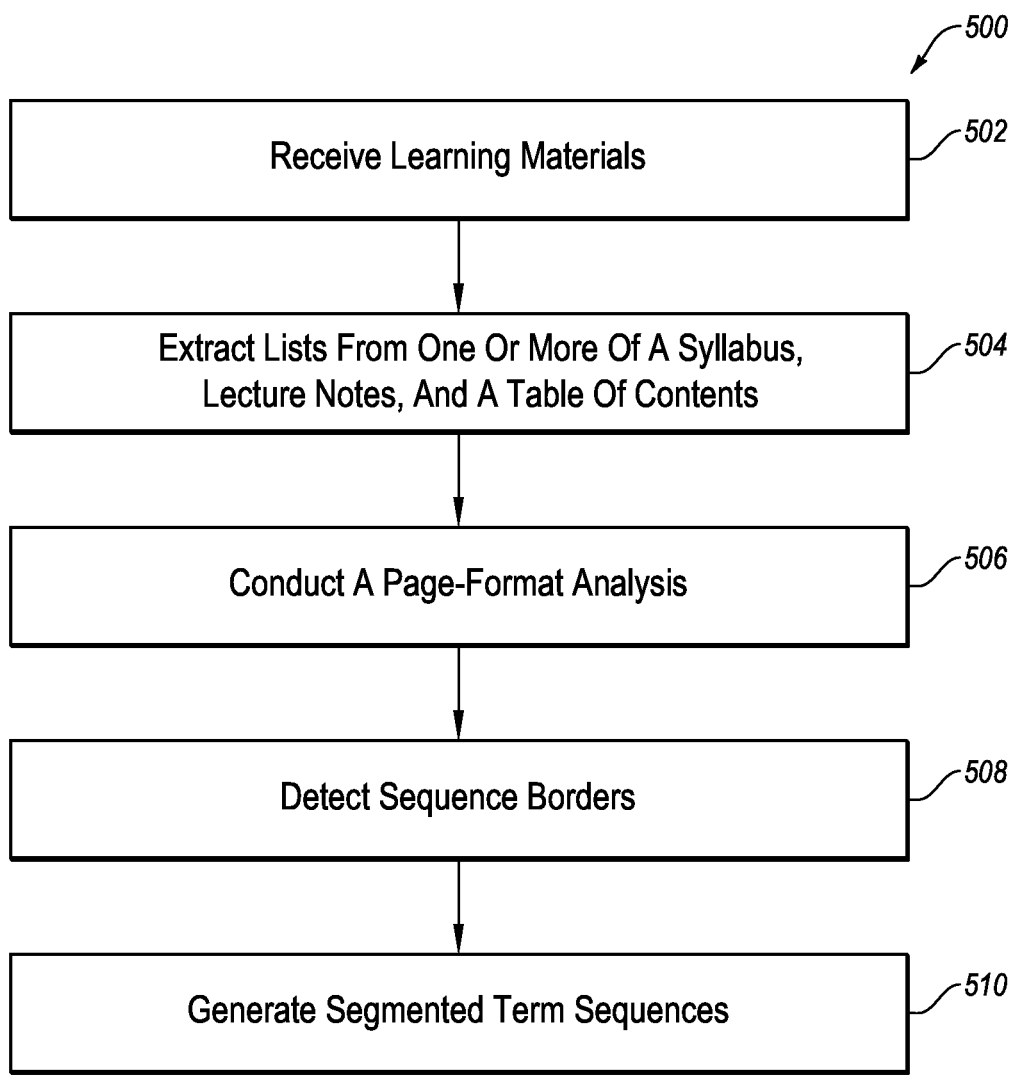
FIG. 5 is a flow diagram of an example method of structural information extraction.

FIG. 5 is a flow diagram of an example method 500 of structural information extraction, arranged in accordance with at least one embodiment described herein. The method 500 may be programmably performed in some embodiments by the analysis server 108 described with reference to FIGS. 1 and 2. The analysis server 108 may include or may be communicatively coupled to a non-transitory computer-readable medium (e.g., the memory 222 of FIG. 2) having stored thereon or encoded therein programming code or instructions that are executable by a processor to perform or cause performance of the method 500. The analysis server 108 may include a processor (e.g., the processor 224 of FIG. 2) that is configured to execute computer instructions to cause or control performance of the method 500. Although illustrated as discrete blocks, various blocks may be divided into additional blocks, combined into fewer blocks, or eliminated, depending on the desired implementation.

The method 500 may begin at block 502. At block 502, learning materials may be received. At block 504, lists may be extracted from one or more of a syllabus, lecture note list, and a table of contents included in the learning materials. At block 506, a page-format analysis may be conducted of one or more pages of the learning materials. At block 508, sequence borders may be detected. The sequence borders may be detected based on one or more of line breaks, table cell borders, sentence borders, and specific punctuation. At block 510, segmented term sequences may be generated. The segmented term sequences may be generated from the lists and the page-format analysis. One or more of the segmented term sequences may be bounded by the detected sequence borders and may include positional information indicating a position in the learning materials (e.g., based on a page analysis). In some embodiments, the learning materials may be crawled. While the learning materials are being crawled, one or more of the operations (e.g., 504, 506, 508, and 510) may be performed.

Figure 6:
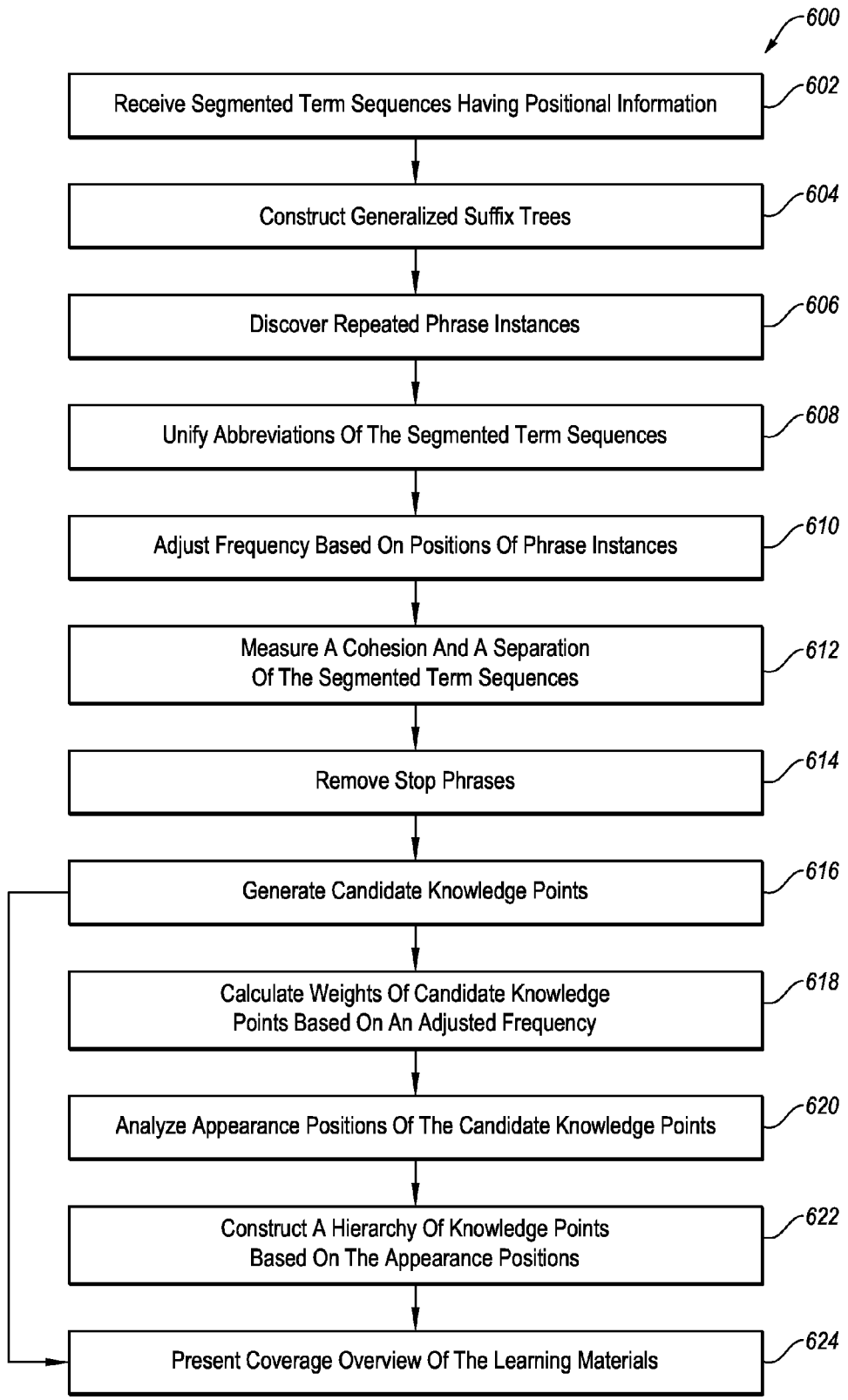
FIG. 6 is a flow diagram of an example method of knowledge point extraction.

FIG. 6 is a flow diagram of an example method 600 of knowledge point extraction, arranged in accordance with at least one embodiment described herein. The method 600 may be programmably performed in some embodiments by the analysis server 108 described with reference to FIGS. 1 and 2. The analysis server 108 may include or may be communicatively coupled to a non-transitory computer-readable medium (e.g., the memory 222 of FIG. 2) having stored thereon or encoded therein programming code or instructions that are executable by a processor to perform or cause performance of the method 600. The analysis server 108 may include a processor (e.g., the processor 224 of FIG. 2) that is configured to execute computer instructions to cause or control performance of the method 600. Although illustrated as discrete blocks, various blocks may be divided into additional blocks, combined into fewer blocks, or eliminated, depending on the desired implementation.

The method 600 may begin at block 602. At block 602, segmented term sequences may be received. The segmented term sequences may have positional information indicating a position in the learning materials of the segmented term sequence. At block 604, generalized suffix trees may be constructed of the segmented term sequences. At block 606, repeated phrase instances may be discovered from the segmented term sequences. The phrase instances may be limited by a particular maximum length. At block 608 abbreviations of the segmented term sequences may be unified. In some embodiments, the abbreviations may be unified using heuristic rules. At block 610, frequency of the discovered repeated phrases instances may be adjusted. The frequency of the discovered repeated phrases may be adjusted based on positions of phrase instances in the learning materials.

At block 612, a cohesion and/or a separation of the segmented term sequences may be measured. The cohesion may be measured according to a mutual information cohesion metric. Additionally or alternatively, the separation may be measured according to an accessor variety separation metric. This step may help filter out some phrases with repeated instances.

At block 614, stop phrases may be removed from the segmented term sequences. At block 616, candidate knowledge points may be generated from the segmented term sequences. From block 616, the method 600 may proceed to block 624 and block 618. At block 624, a coverage overview of the learning materials may be presented. The coverage overview may include an overview of frequency or appearance distributions of the candidate knowledge points in the learning materials and or related courses. For each candidate knowledge point, the overview may show which courses and/or learning materials contain the candidate knowledge point and corresponding appearance of the candidate knowledge point.

At block 618, weights of the candidate knowledge points may be calculated based on the adjusted frequency. In some embodiments, a weight of a candidate knowledge point may be calculated based on a total number or frequency of appearances of the candidate knowledge point in the learning materials 130, a number of courses associated with the learning materials 130 in which the candidate knowledge point appears, and/or a number of learning materials 130 in which the candidate knowledge point appears. For example, the weight of the candidate knowledge point may be calculated according to the following expression in some embodiments:

$$a*TF + b*CN + c*LN.$$

In the above-expression, a, b, and c may represent parameters used to adjust relative importance. "TF" may represent the total number or frequency of appearances of the candidate knowledge point in the learning materials 130, "CN" may represent the number of courses associated with the learning materials 130 in which the candidate knowledge point appears, and "LN" may represent the number of learning materials 130 in which the candidate knowledge point appears. Weights of candidate knowledge points may be used to find the most common and/or important candidate knowledge points.

At block 620, appearance positions of the candidate knowledge points may be analyzed. For example, the granularity of the appearance positions may be determined. At block 622, a hierarchy of knowledge points may be constructed based on the appearance positions. The hierarchy levels of one or more of the knowledge points may be based on appearance positions in the learning materials and the granularity of such positions. In some circumstances, two or more hierarchy levels may be assigned to a particular knowledge point based on the appearance positions in the learning materials. For example, the particular knowledge point may appear in learning materials with a fine granularity and a coarse granularity. In response, the hierarchy level may be assigned to the particular knowledge point based on a frequency at which the particular knowledge point appears at each of the granularities. For instance, the granularity at which the knowledge point appears at with the highest frequency may be assigned to the particular knowledge point.

Figure 7:
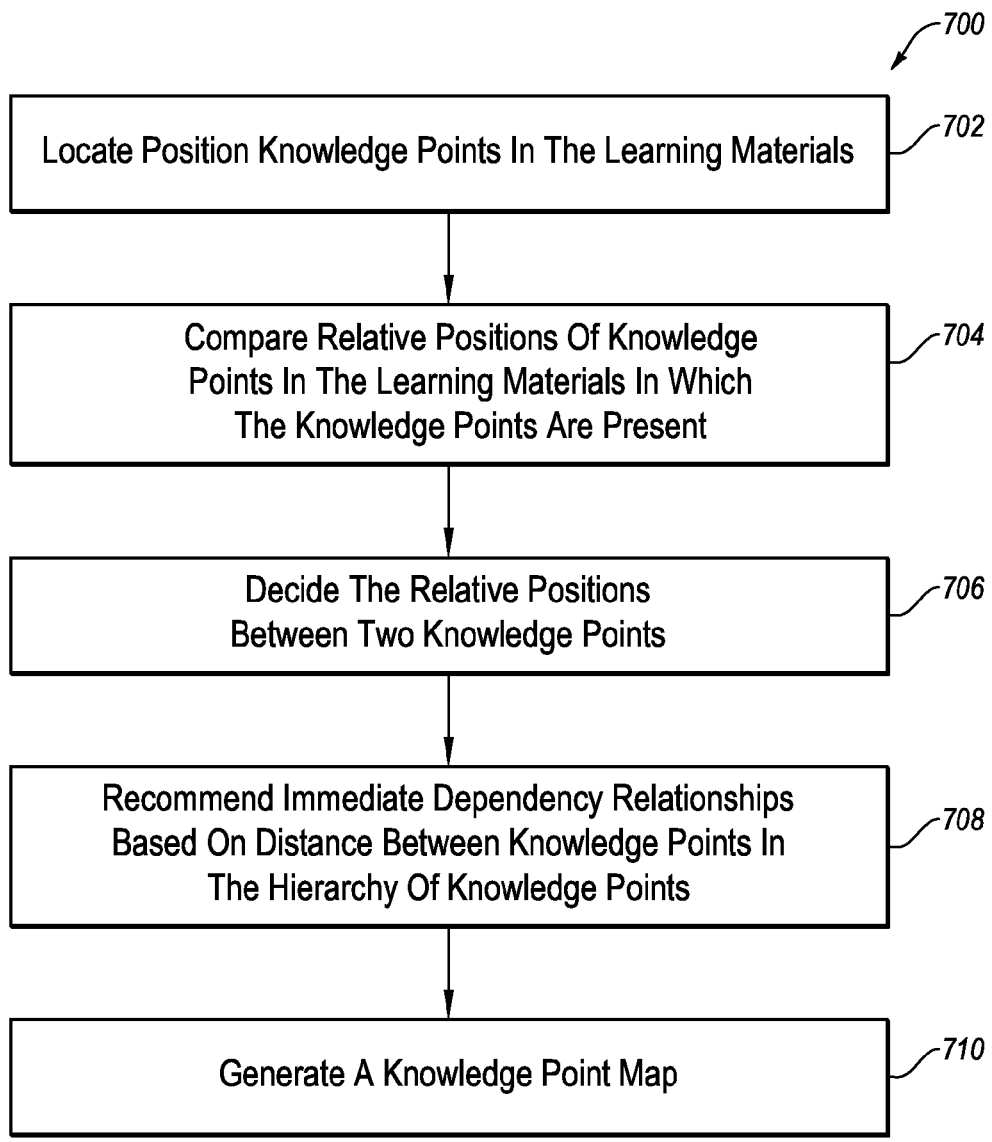
FIG. 7 is a flow diagram of an example method of dependency inference.

FIG. 7 is a flow diagram of an example method 700 of dependency inference, arranged in accordance with at least one embodiment described herein. The method 700 may be programmably performed in some embodiments by the analysis server 108 described with reference to FIGS. 1 and 2. The analysis server 108 may include or may be communicatively coupled to a non-transitory computer-readable medium (e.g., the memory 222 of FIG. 2) having stored thereon or encoded therein programming code or instructions that are executable by a processor to perform or cause performance of the method 700. The analysis server 108 may include a processor (e.g., the processor 224 of FIG. 2) that is configured to execute computer instructions to cause or control performance of the method 700. Although illustrated as discrete blocks, various blocks may be divided into additional blocks, combined into fewer blocks, or eliminated, depending on the desired implementation.

The method 700 may begin at block 702. At block 702, positions of one or more knowledge points may be located in the learning materials. At block 704, relative positions of knowledge points in the learning materials in which the knowledge points are present may be compared. At block 706, relative positions between two knowledge points are decided. For example, in some embodiments the relative positions may be decided by majority order. At block 708, immediate dependency relationships may be recommended based on distance between the knowledge points in a list or hierarchy of knowledge points. At block 710, a knowledge point map may be generated that is representative of the dependency relationships. The embodiments described herein may include the use of a special purpose or general purpose computer including various computer hardware or software modules, as discussed in greater detail below.

Figure 8:
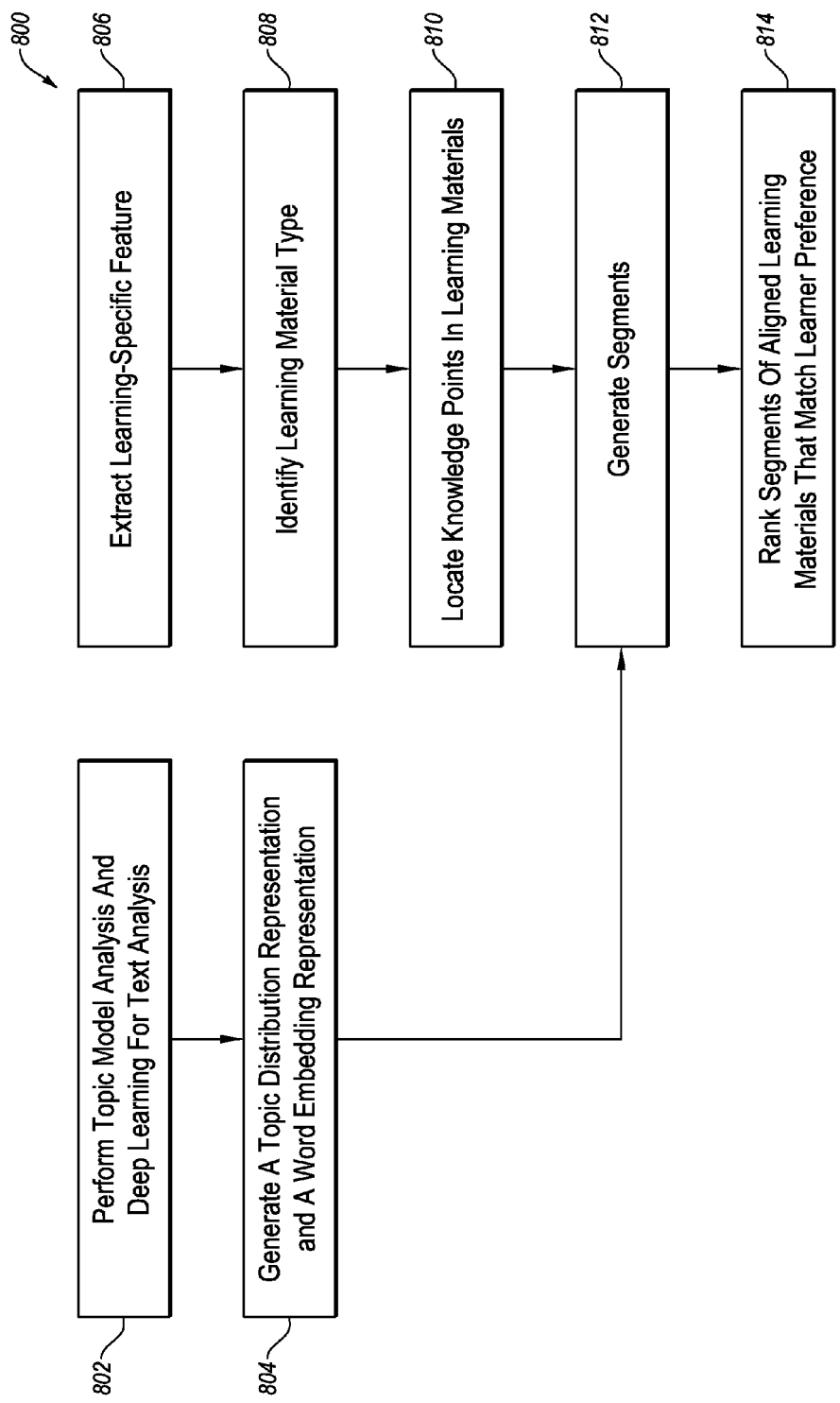
FIG. 8 is a flow diagram of an example method of automatically ranking segments of learning materials aligned with a knowledge point.

FIG. 8 is a flow diagram of an example method 800 of automatically ranking segments of learning materials aligned with a knowledge point, arranged in accordance with at least one embodiment described herein. The method 800 may be programmably performed in some embodiments by the analysis server 108 described with reference to FIGS. 1 and 2. The analysis server 108 may include or may be communicatively coupled to a non-transitory computer-readable medium (e.g., the memory 222 of FIG. 2) having stored thereon or encoded therein programming code or instructions that are executable by a processor to perform or cause performance of the method 800. The analysis server 108 may include a processor (e.g., the processor 224 of FIG. 2) that is configured to execute computer instructions to cause or control performance of the method 800. Although illustrated as discrete blocks, various blocks may be divided into additional blocks, combined into fewer blocks, or eliminated, depending on the desired implementation.

The method 800 may begin at block 802. At block 802, one or more learning materials aligned with a knowledge point may be analyzed. In some embodiments, topic model analysis and/or deep learning may be performed to analyze each of the one or more learning materials. At block 804, a topic distribution representation and a word embedding representation may be generated for each of the one or more learning materials. At block 806, one or more learning-specific features may be extracted from each of the one or more learning materials. At block 808, a learning material type for each of the one or more learning materials may be identified. At block 810, one or more knowledge points may be located in each of the one or more learning materials. At block 812, one or more segments may be generated in each of the one or more learning materials based on the word embedding. At block 814, the one or more segments that match a learner preference may be ranked.

Figure 9:
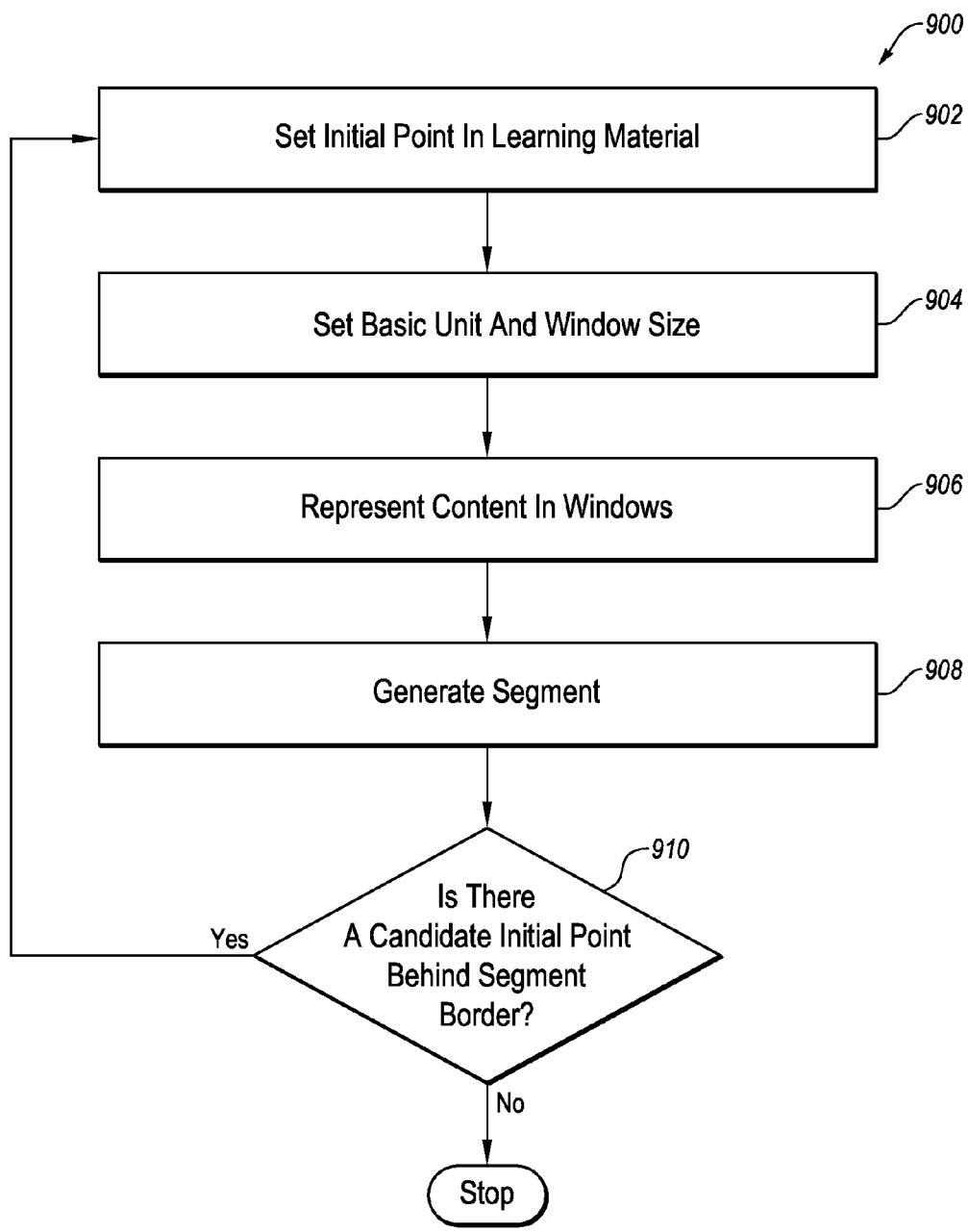
FIG. 9 is a flow diagram of an example method of generating segments in a learning material.

FIG. 9 is a flow diagram of an example method of generating segments in a learning material, arranged in accordance with at least one embodiment described herein. The method 900 may be programmably performed in some embodiments by the analysis server 108 described with reference to FIGS. 1 and 2. The analysis server 108 may include or may be communicatively coupled to a non-transitory computer-readable medium (e.g., the memory 222 of FIG. 2) having stored thereon or encoded therein programming code or instructions that are executable by a processor to perform or cause performance of the method 800. The analysis server 108 may include a processor (e.g., the processor 224 of FIG. 2) that is configured to execute computer instructions to cause or control performance of the method 900. Although illustrated as discrete blocks, various blocks may be divided into additional blocks, combined into fewer blocks, or eliminated, depending on the desired implementation.

The method 900 may begin at block 902. At block 902, an initial point may be set in a learning material. The learning material may be aligned with a knowledge point. At block 904, a basic unit and a window size may be set for the learning material. At block 906, the content in one or more windows in the learning material may be represented using, for example, reduced-dimension vectors. At block 908, a segment may be generated in the learning material. At block 910, it may be determined if there is a candidate initial point behind the segment border in the learning material or, in other words, if there is a candidate initial point that follows the segment border in the learning material. Block 910 may be followed by block 912 if there is not a candidate initial point behind the segment border ("No" at block 910) or by block 914 if there is a candidate initial point behind the segment border ("Yes" at block 910). At block 912, in response to there not being a candidate initial point behind the segment border, searching for candidate initial points and segment generation may stop. At block 914, in response to there being a candidate initial point behind the segment border, the method 900 may return to block 902 from block 912.

Embodiments described herein may be implemented using computer-readable media for carrying or having computer-executable instructions or data structures stored thereon. Such computer-readable media may be any available media that may be accessed by a general purpose or special purpose computer. By way of example, and not limitation, such computer-readable media may include non-transitory computer-readable storage media including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage medium which may be used to carry or store desired program code in the form of computer-executable instructions or data structures and which may be accessed by a general purpose or special purpose computer. Combinations of the above may also be included within the scope of computer-readable media.

Computer-executable instructions may include, for example, instructions and data which cause a general purpose computer, special purpose computer, or special purpose processing device (e.g., one or more processors) to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used herein, the terms "module" or "component" may refer to specific hardware implementations configured to perform the operations of the module or component and/or software objects or software routines that may be stored on and/or executed by general purpose hardware (e.g., computer-readable media, processing devices, etc.) of the computing system. In some embodiments, the different components, modules, engines, and services described herein may be implemented as objects or processes that execute on the computing system (e.g., as separate threads). While some of the system and methods described herein are generally described as being implemented in software (stored on and/or executed by general purpose hardware), specific hardware implementations or a combination of software and specific hardware implementations are also possible and contemplated. In this description, a "computing entity" may be any computing system as previously defined herein, or any module or combination of modulates running on a computing system.

All examples and conditional language recited herein are intended for pedagogical objects to aid the reader in understanding the invention and the concepts contributed by the inventor to furthering the art, and are to be construed as being without limitation to such specifically recited examples and conditions. Although embodiments of the present inventions have been described in detail, it should be understood that the various changes, substitutions, and alterations could be made hereto without departing from the spirit and scope of the invention.

What we claim is:

1. A method comprising:
  locating a plurality of occurrences of a knowledge point in a learning material;

selecting one or more candidate initial points from the plurality of occurrences of the knowledge point;

setting a first candidate initial point of the one or more candidate initial points as a first initial point;

creating a first window in the learning material that includes the first initial point, wherein the first window includes a first-window size that corresponds to one or more basic units;

creating a second window in the learning material, wherein a start of the second window follows a start of the first window by a first separation size, and wherein the second window includes a second-window size that corresponds to the one or more basic units;

calculating a window similarity between first-window content of the first window and second-window content of the second window;

in response to the window similarity between the first-window content of the first window and the second-window content of the second window meeting a similarity threshold, generating a first segment with first-segment content that includes at least the first-window content and the second-window content;

detecting a position for a first segment border of the first segment that indicates an end of the first segment in which the detecting includes:
  sliding the first window and the second window through the learning material by a step size to create a first new window and a second new window such that the second-window content of the second window is the same as first new-window content of the first new window; and
  determining whether a new-window similarity between the first new-window content and second new-window content meet the similarity threshold;

calculating a first-segment consistency measurement for the first segment based on a first-segment similarity between the first-segment content in the first segment and the knowledge point;

ranking, according to one or more computer-executable expressions, the first segment with respect to one or more of the following: a second segment in the learning material and a third segment in a different learning material, wherein the ranking of the first segment is based on one or more of the following: a quality measurement, a learning material type of the learning material, a length of the first segment, and the first-segment consistency measurement of the first segment; and recommending the first segment to a learner based on the ranking of the first segment.

2. The method of claim 1, further comprising, in response to the window similarity between the first-window content of the first window and the second-window content of the second window meeting a similarity threshold:
  creating the first new window in the learning material, wherein a start of the first new window follows a start of the first window by the step size;
  creating the second new window in the learning material, wherein a start of the second new window follows a start of the first new window by a second separation size, and wherein the second new window follows the first window in the learning material;
  calculating the new-window similarity between first new-window content of the first new window and second new-window content of the second new window; and
  in response to the new-window similarity between the first new-window content of the first new window and the second new-window content of the second new window meeting the similarity threshold, adding the first new-window content and the second new-window content to the first segment; or
  in response to the new-window similarity between the first new-window content of the first new window and the second new-window content of the second new window failing to meet the similarity threshold, generating the first segment border at the first new window.

3. The method of claim 1, wherein selecting the one or more candidate initial points from the plurality of occurrences of the knowledge point includes selecting, as a candidate initial point, an occurrence of the knowledge point located in: a title of a video included in the learning material, a transcript of the video, a title of an article included in the learning material, or a title corresponding to one or more slides included in the learning material.

4. The method of claim 1, further comprising:
  setting a score for each of the plurality of occurrences of the knowledge point in the learning material, wherein the score for an occurrence of the knowledge point in a title of the learning material is higher than the score for an occurrence of the knowledge point in a text of the learning material; and
  adjusting the first-segment consistency measurement based on a sum of the scores for each of the plurality of occurrences of the knowledge point in the learning material.

5. The method of claim 1, further comprising:
creating a third new window in the learning material;
creating a fourth new window in the learning material that is adjacent to the third new window;
calculating a second window similarity between third new-window content of the third new window and fourth new-window content of the fourth new window;
in response to the second window similarity between the third new-window content of the third new window and the fourth new-window content of the fourth new window meeting a similarity threshold, generating the second segment that includes at least the third new-window content and the fourth new-window content;
calculating a second-segment consistency measurement for the second segment, wherein the second-segment consistency measurement for the second segment is based on a similarity between a second-segment content in the second segment and the knowledge point; and
ranking the second segment with respect to the first segment in the learning material based on one or more of the following: a quality measurement, the learning material type of the learning material, a length of the second segment, and the second-segment consistency measurement of the second segment.

6. The method of claim 1, wherein:
the first separation size corresponds to one or more basic units;
the first-window size corresponds to a same number of the basic unit as the second-window size;
the first window and the second window overlap in response to the first-window size corresponding to a greater number of the basic unit than the first separation size; and
the first window is adjacent to the second window in response to the first-window size corresponding to a same number of the basic unit as the first separation size.

7. The method of claim 1, wherein:
in response to the learning material type of the learning material including a video, the one or more basic units include one or more sentences of a transcript for the video;
in response to the learning material type of the learning material including an article, the one or more basic units include one or more sentences of the article; and
in response to the learning material type of the learning material including one or more slides, the one or more basic units include a quantity of slides.

8. The method of claim 1, wherein:
in response to the first segment being located in a video, the length of the first segment is based on a duration of the first segment;
in response to first segment being located in an article or text, the length of the first segment is based on a number of words or bytes in the first segment; and
in response to the first segment being located in one or more slides, the length of the first segment is based on a quantity of slides in the first segment.

9. The method of claim 1, wherein the first segment matches a learner preference that includes one or more of the following: a learning material type, a window size, a learning-specific feature, a learning material age, a segment age, and a segment length.

10. A system, comprising:
one or more processors;
non-transitory computer readable media that include instructions thereon that, in response to execution by the one or more processors, control performance of operations comprising:
locating a plurality of occurrences of a knowledge point in a learning material;
selecting one or more candidate initial points from the plurality of occurrences of the knowledge point;
setting a first candidate initial point of the one or more candidate initial points as a first initial point;
creating a first window in the learning material that includes the first initial point, wherein the first window includes a first-window size that corresponds to one or more basic units;
creating a second window in the learning material that is adjacent to the first window, wherein a start of the second window follows a start of the first window by a first separation size, and wherein the second window includes a second-window size that corresponds to the one or more basic units;
calculating a window similarity between first-window content of the first window and second-window content of the second window;
in response to the window similarity between the first-window content of the first window and the second-window content of the second window meeting a similarity threshold, generating a first segment with first-segment content that includes at least the first-window content and the second-window content;
detecting a position for a first segment border of the first segment that indicates an end of the first segment in which the detecting includes:
sliding the first window and the second window through the learning material by a step size to create a first new window and a second new window such that the second-window content of the second window is the same as first new-window content of the first new window, and
determining whether a new-window similarity between the first new-window content and second new-window content meet the similarity threshold;
calculating a first-segment consistency measurement for the first segment based on a first-segment similarity between the first-segment content in the first segment and the knowledge point;
ranking, according to one or more computer-executable expressions, the first segment with respect to one or more of the following: a second segment in the learning material and a third segment in a different learning material, wherein the ranking of the first segment is based on one or more of the following: a quality measurement, a learning material type of the learning material, a length of the first segment, and the first-segment consistency measurement of the first segment; and
recommending the first segment to a learner based on the ranking of the first segment.

11. The system of claim 10, wherein in response to the window similarity between the first-window content of the first window and the second-window content of the second window meeting a similarity threshold, an analysis server is configured to generate the first segment with the first-segment content that includes at least the first-window content and the second-window content by being configured to:
create the first new window in the learning material, wherein a start of the first new window follows a start of the first window by the step size;
create the second new window in the learning material, wherein a start of the second new window follows a start of the first new window by a second separation size, and wherein the second new window follows the first window in the learning material;
calculate the new-window similarity between first new-window content of the first new window and second new-window content of the second new window; and
in response to the new-window similarity between the first new-window content of the first new window and the second new-window content of the second new window meeting the similarity threshold, add the first new-window content and the second new-window content to the first segment; or
in response to the new-window similarity between the first new-window content of the first new window and the second new-window content of the second new window failing to meet the similarity threshold, generate the first segment border at the first new window.

12. The system of claim 10, wherein an analysis server is configured to select one or more candidate initial points from the plurality of occurrences of the knowledge point by being configured to select, as a candidate initial point, an occurrence of the knowledge point located in: a title of a video included in the learning material, a transcript of the video, a title of an article included in the learning material, or a title corresponding to one or more slides included in the learning material.

13. The system of claim 10, wherein an analysis server is configured to:
set a score for each of the plurality of occurrences of the knowledge point in the learning material, wherein the score for an occurrence of the knowledge point in a title of the learning material is higher than the score for an occurrence of the knowledge point in a text of the learning material; and adjust the first-segment consistency measurement based on a sum of the scores for each of the plurality of occurrences of the knowledge point in the learning material.

14. The system of claim 10, wherein an analysis server is configured to:

create a third new window in the learning material;

create a fourth new window in the learning material that is adjacent to the third new window;

calculate a second window similarity between third new-window content of the third new window and fourth new-window content of the fourth new window;

in response to the second window similarity between the third new-window content of the third new window and the fourth new-window content of the fourth new window meeting a similarity threshold, generate the second segment that includes at least the third new-window content and the fourth new-window content;

calculate a second-segment consistency measurement for the second segment, wherein the second-segment consistency measurement for the second segment is based on a similarity between a second-segment content in the second segment and the knowledge point; and rank the second segment with respect to the first segment in the learning material based on one or more of the following: a quality measurement, the learning material type of the learning material, a length of the second segment, and the second-segment consistency measurement of the second segment.

15. The system of claim 10, wherein the first segment matches a learner preference that includes one or more of the following: a learning material type, a window size, a learning-specific feature, a learning material age, a segment age, and a segment length.

16. A non-transitory computer-readable medium that includes computer-readable instructions stored thereon that are executable by a processor to perform or control performance of operations comprising:

locating a plurality of occurrences of a knowledge point in a learning material;

selecting one or more candidate initial points from the plurality of occurrences of the knowledge point;

setting a first candidate initial point of the one or more candidate initial points as a first initial point;

creating a first window in the learning material that includes the first initial point, wherein the first window includes a first-window size that corresponds to one or more basic units;

creating a second window in the learning material, wherein a start of the second window follows a start of the first window by a first separation size, and wherein the second window includes a second-window size that corresponds to the one or more basic units;

calculating a window similarity between first-window content of the first window and second-window content of the second window;

in response to the window similarity between the first-window content of the first window and the second-window content of the second window meeting a similarity threshold, generating a first segment with first-segment content that includes at least the first-window content and the second-window content;

detecting a position for a first segment border of the first segment that indicates an end of the first segment in which the detecting includes:

sliding the first window and the second window through the learning material by a step size to create a first new window and a second new window such that the second-window content of the second window is the same as a first new-window content of the first new window; and determining whether a new-window similarity between the first new-window content and a second new-window content meet the similarity threshold;

calculating a first-segment consistency measurement for the first segment based on a first-segment similarity between the first-segment content in the first segment and the knowledge point;

ranking, according to one or more computer-executable expressions, the first segment with respect to one or more of the following: a second segment in the learning material and a third segment in a different learning material, wherein the ranking of the first segment is based on one or more of the following: a quality measurement, a learning material type of the learning material, a length of the first segment, and the first-segment consistency measurement of the first segment; and recommending the first segment to a learner based on the ranking of the first segment.

17. The non-transitory computer-readable medium of claim 16, wherein the operations further comprise, in response to the window similarity between the first-window content of the first window and the second-window content of the second window meeting a similarity threshold:

creating the first new window in the learning material, wherein a start of the first new window follows a start of the first window by the step size;

creating the second new window in the learning material, wherein a start of the second new window follows a start of the first new window by a second separation size, and wherein the second new window follows the first window in the learning material;

calculating the new-window similarity between first new-window content of the first new window and second new-window content of the second new window; and in response to the new-window similarity between the first new-window content of the first new window and the second new-window content of the second new window meeting the similarity threshold, adding the first new-window content and the second new-window content to the first segment; or in response to the new-window similarity between the first new-window content of the first new window and the second new-window content of the second new window failing to meet the similarity threshold, generating the first segment border at the first new window.

18. The non-transitory computer-readable medium of claim 16, wherein selecting the one or more candidate initial points from the plurality of occurrences of the knowledge point includes selecting, as a candidate initial point, an occurrence of the knowledge point located in: a title of a video included in the learning material, a transcript of the video, a title of an article included in the learning material, or a title corresponding to one or more slides included in the learning material.

19. The non-transitory computer-readable medium of claim 16, wherein the first segment matches a learner preference that includes one or more of the following: a learning material type, a window size, a learning-specific feature, a learning material age, a segment age, and a segment length.

20. The method of claim 1, wherein the one or more computer-executable expressions include:

Consistency Measurement=Similarity($\vec{q}, \vec{e}$)=cos(θ), 0<cos(θ) <1;

a×QM+b×CM+c×L+d×TM; and $a+b+c+d=1$, wherein:
- $\vec{q}$ represents a term vector of a knowledge point or a query;
- $\vec{e}$ represents a term vector of a segment;
- cos(θ) represents the cosine of an angle θ between the term vectors $\vec{q}$ and $\vec{e}$;
- QM represents a quality measurement for a segment;
- CM represents a consistency measurement for a segment;
- L represents a length of a segment;
- TM represents a learning material type;
- a, b, c, and d represent weights corresponding to the quality measurement, the consistency measurement, the length of the segment, and the learning material type, respectively; and
- × is a scalar multiplier.

\* \* \* \* \*